United States Patent

[11] 3,579,818

[72] Inventors Richard B. Arnold;
  Dallas F. Smith, Fort Wayne, Ind.
[21] Appl. No. 806,057
[22] Filed Mar. 11, 1969
[45] Patented May 25, 1971
[73] Assignee General Electric Company

[54] METHOD AND APPARATUS FOR FORMING SHAPED INSULATORS AND FOR DEVELOPING COILS OF A MAGNETIC CORE
20 Claims, 16 Drawing Figs.

[52] U.S. Cl. .................................................. 29/596,
  29/205, 29/606, 93/1
[51] Int. Cl. .................................................. H02k 15/00
[50] Field of Search ........................................... 29/205 (I),
  205 (C), 205, 596, 598, 605, 606; 93/1

[56] References Cited
UNITED STATES PATENTS

| | | | |
|---|---|---|---|
| 1,980,170 | 11/1934 | Eaton | 29/205X |
| 2,432,267 | 12/1947 | Adamson | 29/205 |
| 2,934,099 | 4/1960 | Mason | 29/205X |
| 2,958,122 | 11/1960 | Turk | 29/205 |
| 3,151,638 | 10/1964 | Hill | 29/205X |
| 3,324,536 | 6/1967 | Hill | 29/205 |
| 3,447,225 | 6/1969 | Eminger | 29/205 |

Primary Examiner—John F. Campbell
Assistant Examiner—Carl E. Hall
Attorneys—John M. Stoudt, Radford M. Reams, Jon C. Gealow, Frank L. Neuhauser and Oscar B. Waddell ABSTRACT: Method and apparatus for developing shaped insulators of different axial lengths and coil turns into coil groups in preselected slots of a magnetic core. The insulators are automatically formed into the desired lengths from a continuous strip of insulative material at an insulator-forming station by apparatus including a feeding mechanism, slotted magazine, cutter, and linkage having a movable pivot operative to effect a change in the length of material advanced into predetermined slots of the magazine. The magazine is mounted to telescope with an outer surface of an insulator and turn-accommodating mechanism or assembly into which the insulators are transferred. Turns are formed into coil groups in the assembly through the outer surface at a turn-forming station, and thereafter the coil groups and insulators are distributed into the preselected slots of the core from the assembly. Where two or more winding phases are to be distributed, the core may be conveniently mounted in a holding device carried by a conveyor which transports the core through a first phase-winding development, where the insulators and one winding are placed in the core, a winding pressback station where the winding is transformed into the desired configuration, and into a second phase-winding development where additional insulators and a winding are added to the core.

INSULATOR-FORMING STATION I

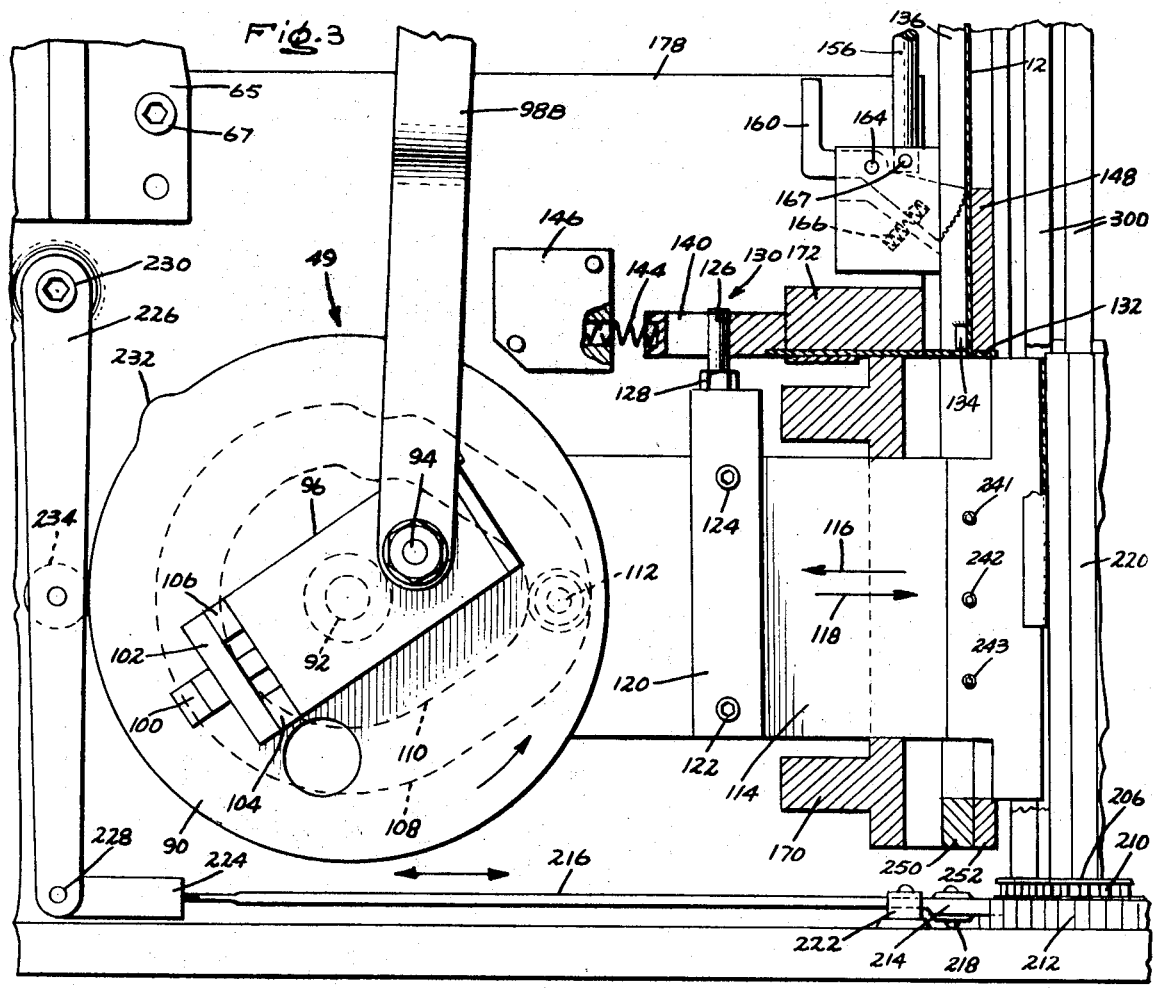
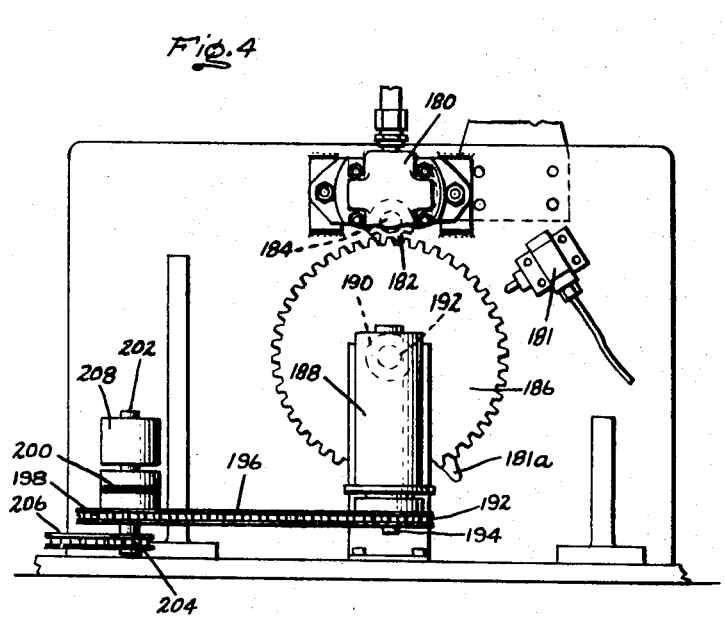
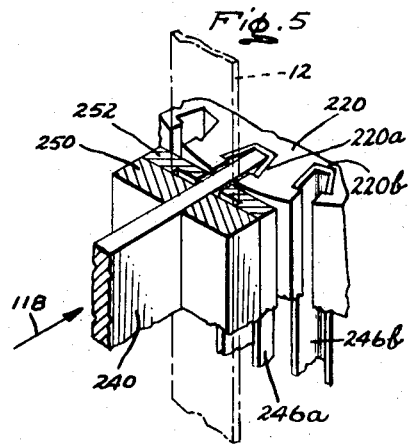
INVENTORS:
Richard B. Arnold,
Dallas F. Smith,
BY John M. Stoudt
Attorney.

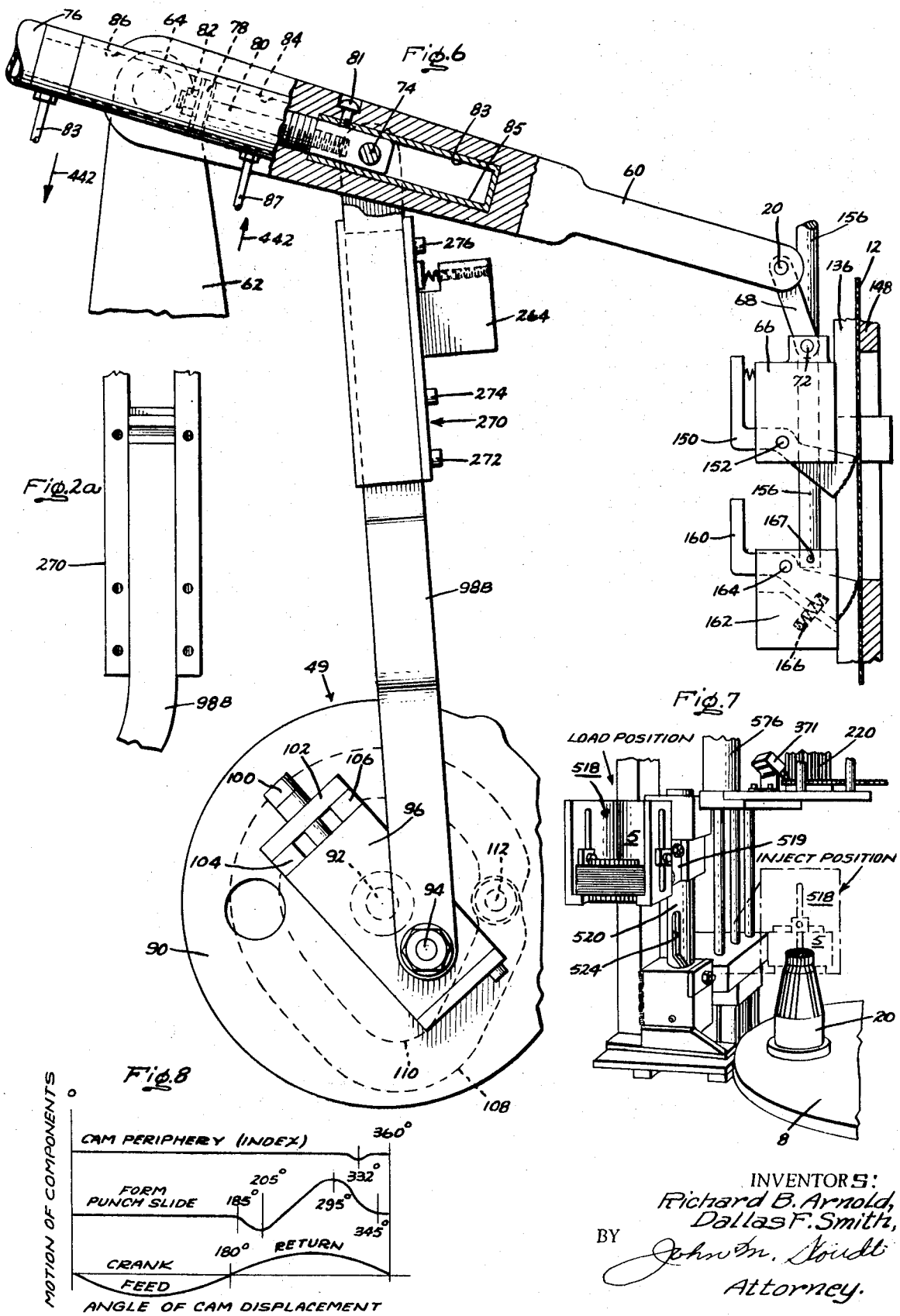

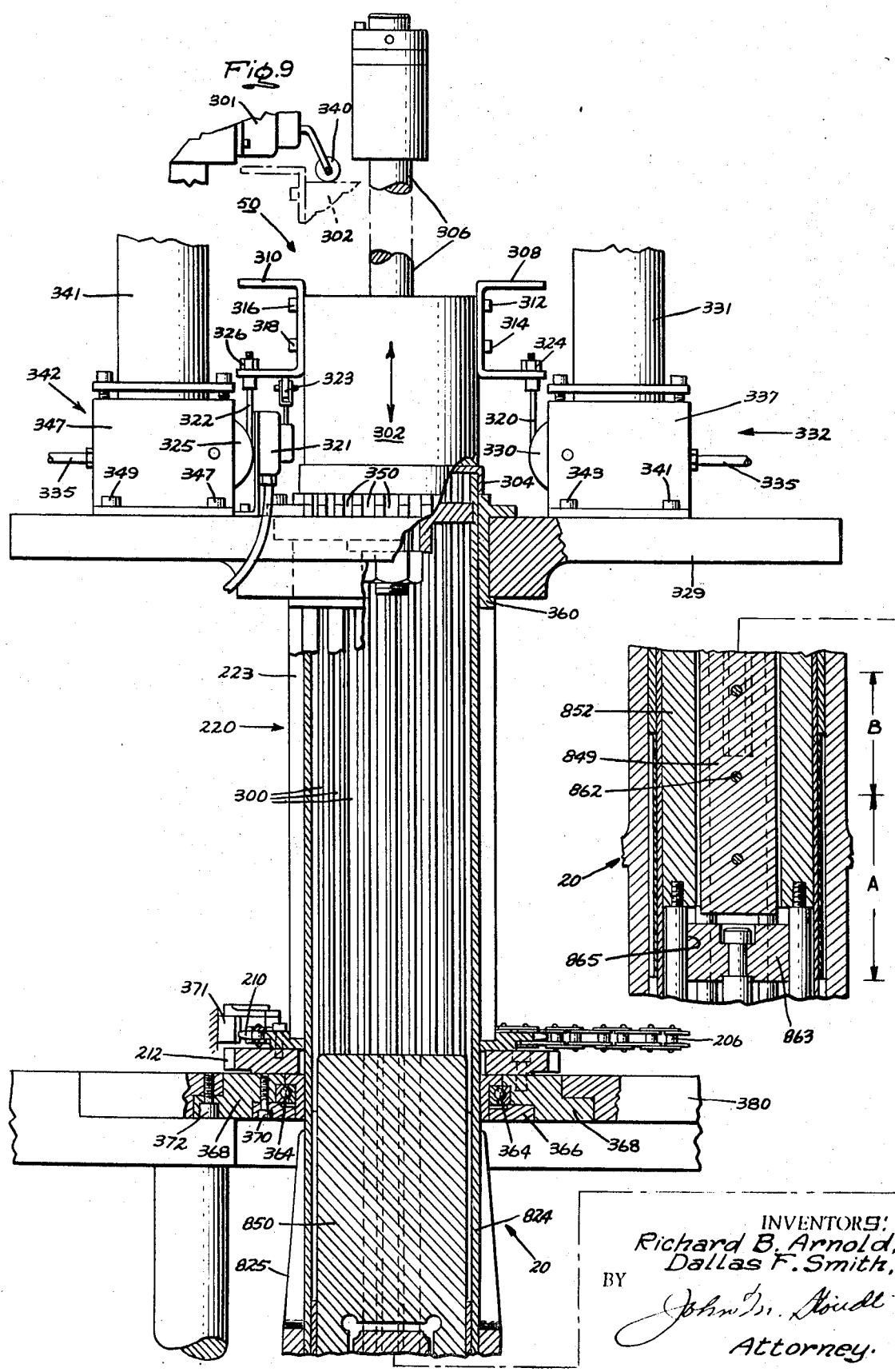

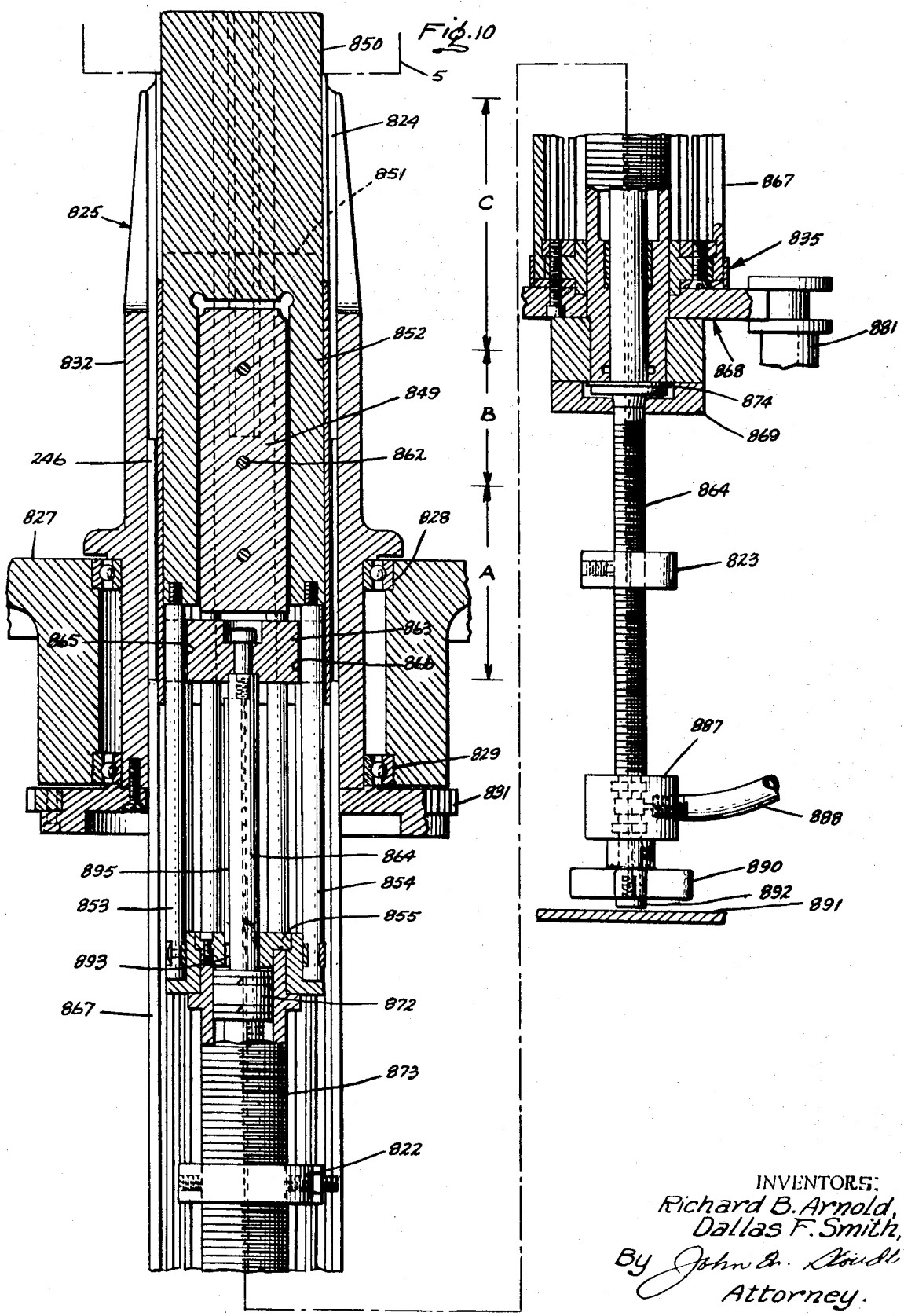

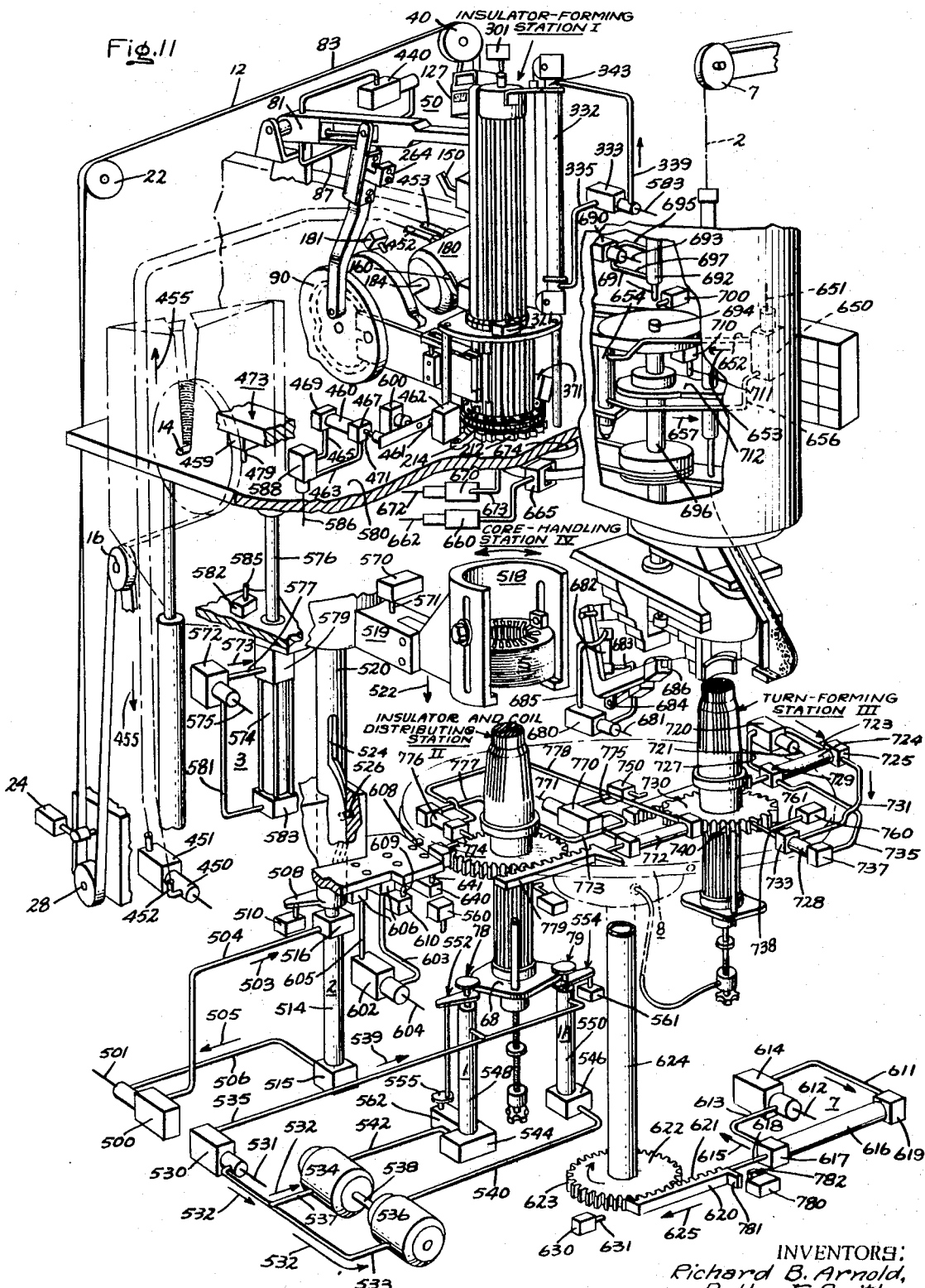

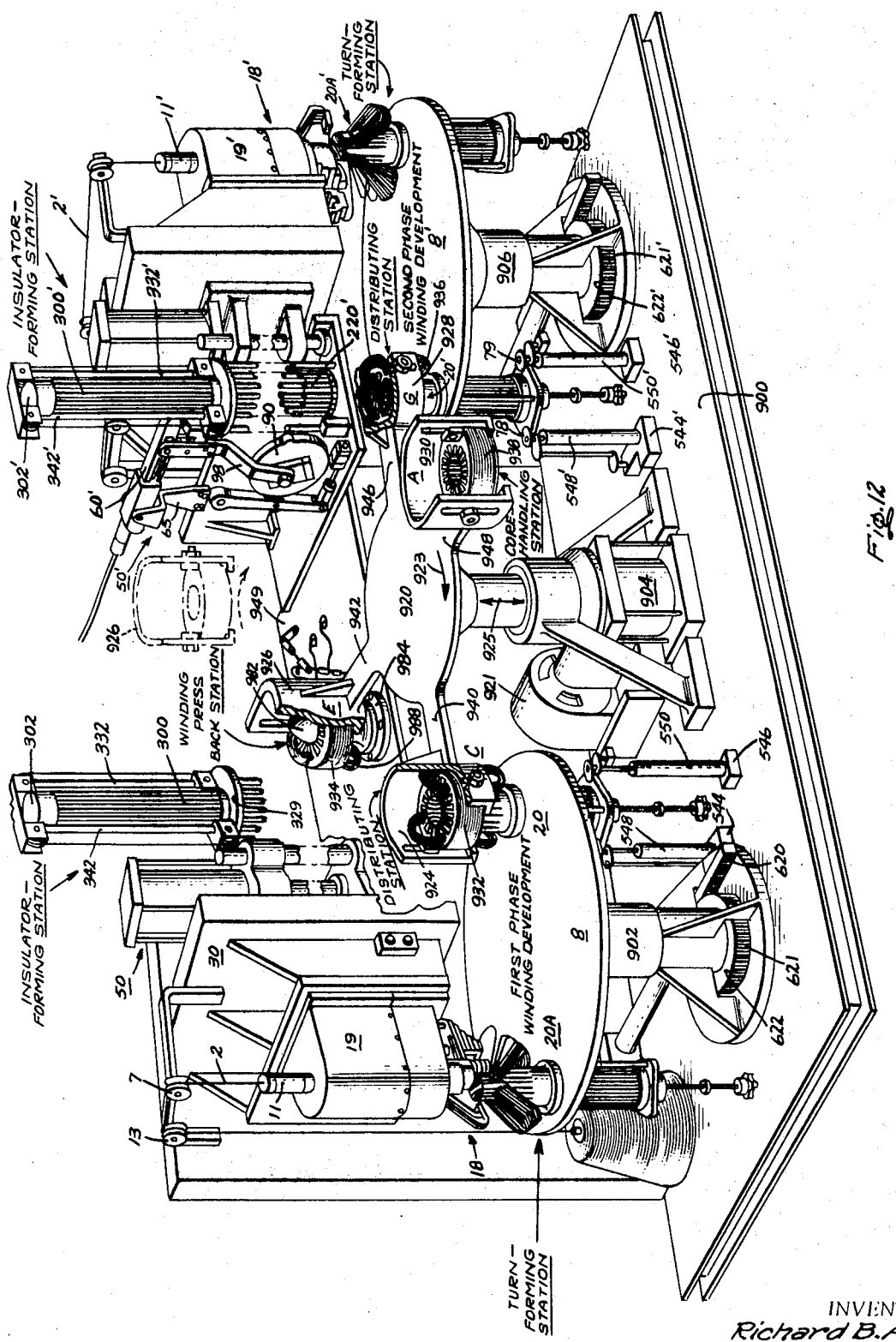

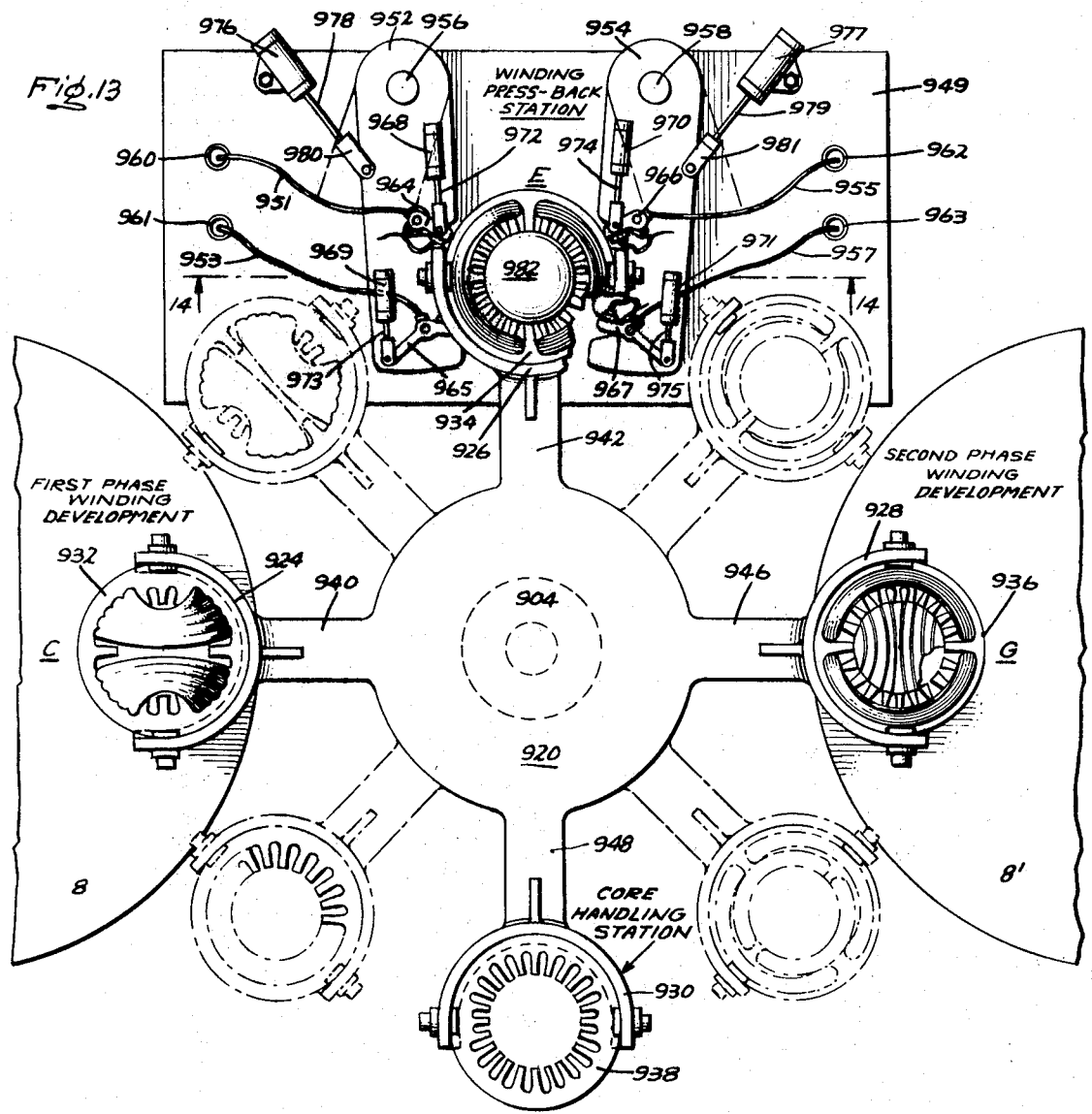
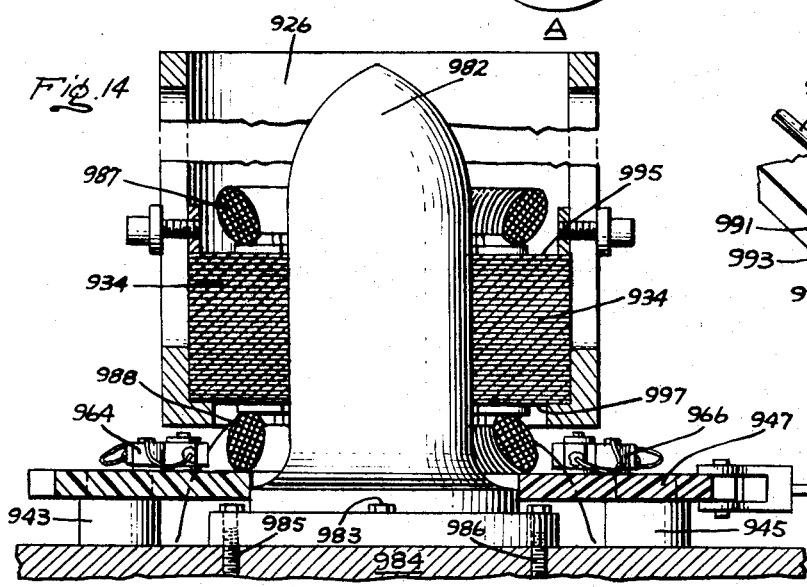
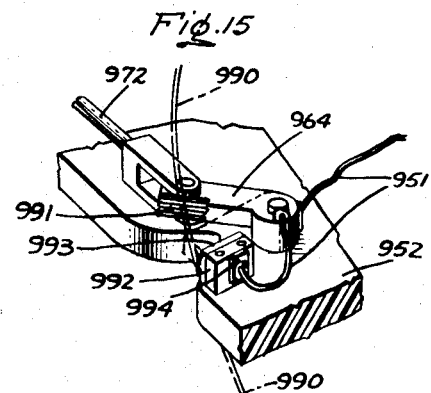

METHOD AND APPARATUS FOR FORMING SHAPED INSULATORS AND FOR DEVELOPING COILS OF A MAGNETIC CORE

CROSS-REFERENCE TO RELATED COPENDING APPLICATIONS

The following copending applications, assigned to the same assignee as the present invention, are expressly incorporated by reference in the present application: Apparatus For Inserting Insulators And Coil Turns Into The Slots Of A Magnetic Core, Richard B. Arnold, Ser. No. 875,895 filed Nov. 12, 1969 which is a continuation-in-part of Ser. No. 748,405 filed July 29, 1968, now abandoned and Coil Developing Apparatus, Richard B. Arnold, Ser. No. 884,145 filed Dec. 11, 1969 which is a continuation-in-part of Ser. No. 748,406 filed July 29, 1968, now abandoned.

BACKGROUND OF THE INVENTION

The present invention is directed to methods of and apparatus for automatically forming insulators of the desired shapes and for developing coils of electromagnetic devices, and move particularly to automatically forming wedgelike insulators of different lengths and developing coil groups and to place the formed insulators and developed coil groups in a magnetic core, such as the stator member of a dynamoelectric machine.

In the manufacture of electromagnetic devices, and in particular the production of stator members having at least two phase windings, carried by magnetic cores, for use in dynamoelectric machines such as electric motors, insulators of different axial lengths, such as in between coil side phase insulators and the somewhat shorter slot closure or wedge insulators, are normally preshaped from suitable strip material, for instance compressed paper, polyethylene terephthalate, and the like and then inserted into axially extending slots of the stator core during manufacture of the core. In regard to stators, it is quite desirable to fabricate the phase insulators of greater lengths than the slot closure insulators since the phase insulators have end sections extending between coil end turns of different phases adjacent each side face of the core for insulation purposes at those locations. After one phase winding is distributed in appropriate slots of the stator core, it is customary to insert the phase insulators over sides of the winding already in the slots adapted to accommodate sides of another phase winding at this stage of manufacture. The closure insulators are normally disposed over winding sides in slots where additional phase windings are not installed. It is also quite desirable to be able to utilize the same methods and equipment in the manufacture of stators of different sizes and configurations. The foregoing all contribute to the difficulty being experienced in effecting efficiency, economy, speed, and versatility in the satisfactory manufacture of electromagnetic devices.

SUMMARY OF THE INVENTION

Consequently, it is an object of the present invention to provide improved methods and apparatus for forming shaped insulators and for developing windings of magnetic cores.

It is another object of the present invention to provide improved methods and apparatus for effecting the desirable features and overcome the difficulties mentioned above in connection with the manufacture of electromagnetic devices, including improvements in effecting efficiency, economy, speed and versatility in such manufacture.

It is yet another object of the present invention to provide improved methods and apparatus for automatically forming shaped insulators of different axial lengths and for placing such insulators into selected slots of electromagnetic devices.

It is still another object of the invention to provide improvements in methods and apparatus for coordinating the effective development of insulators and windings in magnetic cores of stators and the like.

In accordance with one form of the present invention we have provided method and apparatus for forming insulators and for developing coils in preselected slots of a slotted structure. The apparatus, in one form thereof, includes means for forming insulators in slots of an insulator-receiving mechanism related to preselected slots of the slotted structure and means for transferring the insulators from the mechanism into guide apertures of an insulator and coil-turn inserting assembly, with the slots of the mechanism disposed in alignment with the guide apertures. The assembly has means for receiving coil turns and means for inserting the insulators and coil turns into the preselected slots of the slotted structure when the slots of the slotted structure are in alignment with the apertures of the assembly. The apparatus also includes holding means for retaining the slotted structure in aligned position as the insulators and coil turns are inserted into the preselected slots. There also is means for pressing back the coil turns relative to the slotted structure as the slotted structure is retained by the holding means and conveyor means for transporting the holding means, having the slotted structure, from the assembly to the means for pressing back the coil turns.

BRIEF DESCRIPTION OF THE DRAWINGS

The subject matter which we regard as our invention is particularly pointed out and distinctly claimed in the concluding portion of the specification. The invention itself, however, together with further objects and advantages thereof may be better understood by reference to the following description taken in conjunction with the accompanying drawings in which like reference numerals identify like components, and in which:

FIG. 2a is a front view of a part of the connecting arm arrangement of the components illustrated in FIG. 2;

FIG. 3 is a side view in partial section depicting a portion of the components seen in FIG. 2 as the severed length of insulative material is being transferred into an insulator-receiving magazine;

FIG. 4 is a rear view of a drive means provided for the insulator-making components generally depicted in FIGS. 1 and 2;

FIG. 5 is a view in perspective of a portion of the components seen in FIG. 3 revealing the severed length being placed into a slot of the insulator-receiving magazine;

FIG. 6 is a side view in partial section, similar to the view in FIG. 2, revealing the components automatically set for producing an insulator of another length from the same continuous strip of insulative material;

FIG. 7 is a view in perspective depicting the stator core load and insulator-coil inject relative positions of the insulator-receiving magazine, stator core and injection tooling;

FIG. 8 is a schematic cam development diagram showing motion of the insulator-making timing unit components versus the angle of displacement for a motion control cam member;

FIG. 9 is a front view in partial section depicting the telescoping relationship of the injection or insertion tooling and insulator-receiving magazine of the apparatus of Fig. 1 revealing the placing of the insulators from the magazine into the insertion tooling;

FIG. 10 is a sectional view of the insertion tooling shown in FIG. 9 illustrating the position of the various parts of the apparatus in the initial position prior to the development of coil turns in the tooling;

FIG. 11 is a schematic presentation of the improved apparatus generally depicted in FIG. 1, and is helpful in explaining the sequential operation of the illustrated embodiment of the machine;

FIG. 12 is a perspective view of another physical arrangement which the improved apparatus may take in practicing the inventive method, and depicts separate insulator-making and phase-winding development stations for phase windings with a winding or coil pressback station positioned intermediate the phase-winding development stations;

FIG. 13 is a plan view of the coil pressback and core-handling stations, partially broken away, depicted in FIG. 12;

FIG. 14 is an enlarged view in partial section, taken along the lines 14–14 in FIG. 13, showing the components of the coil pressback station and stator core with one winding therein after that winding has been pressed back prior to its transportation to the second phase-winding development station; and FIG. 15 is a perspective view of a pivoted electrical connector arrangement shown in FIG. 14 for connecting the first phase winding to a suitable electrical power source which may be effectively employed in pressing back the winding electromagnetically.

DESCRIPTION OF THE PREFERRED EMBODIMENTS

Figure 1:
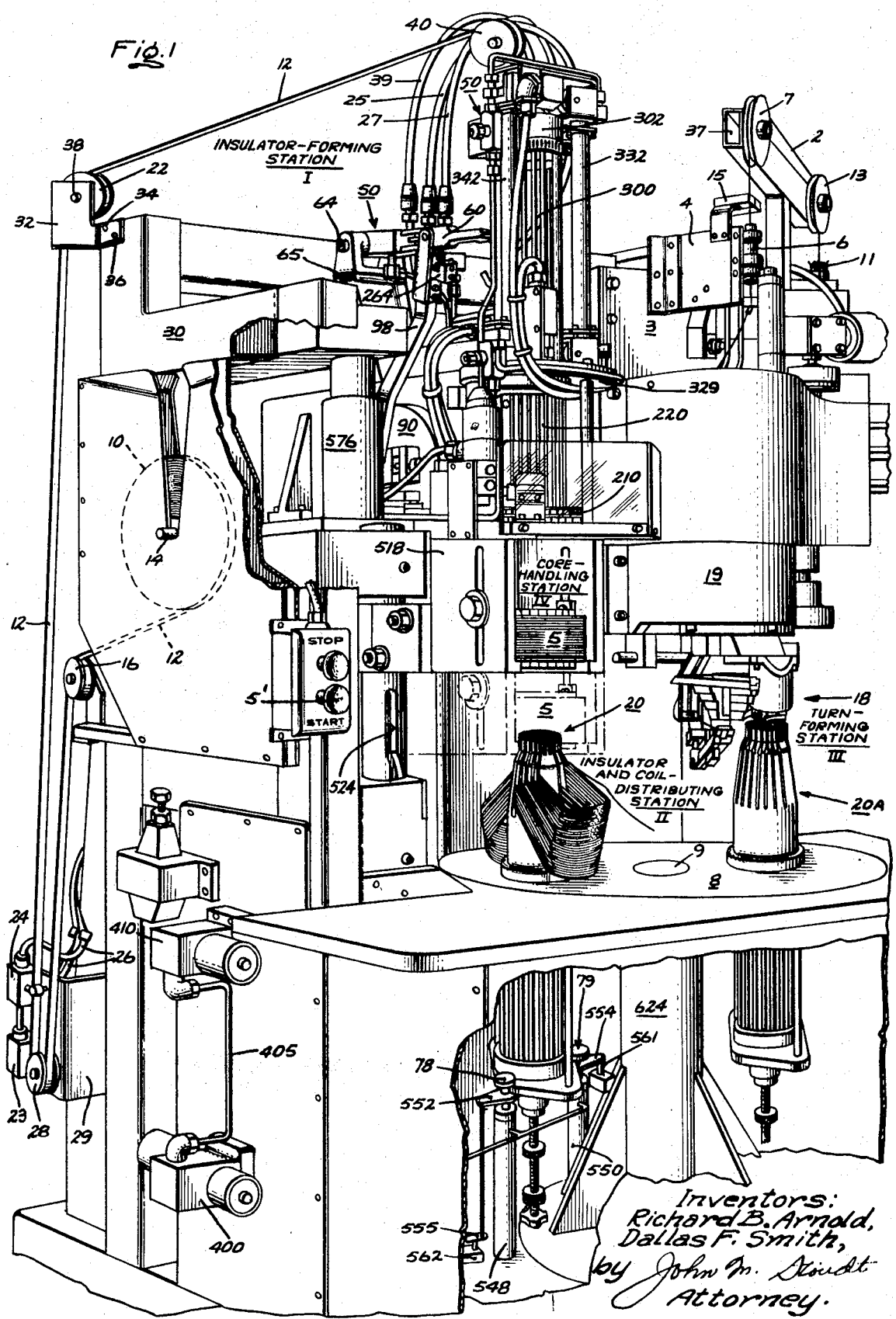
FIG. 1 is a view in perspective of the general physical arrangement of incorporating one form of the present invention and capable of practicing the inventive method in connection with the manufacture of slotted structures having insulators and coils in the slots of inductive devices, for instance, a stator for use in a fractional horsepower size dynamoelectric machine in the illustrated exemplification.

In order to disclose the principles of our invention, improved apparatus capable of practicing the inventive method are illustrated in connection with the manufacture of slotted structure incorporated in electromagnetic devices; e.g., stators for use in single-phase induction dynamoelectric machines in the two exemplifications of FIGS. 1–11 inclusive and of FIGS. 12–15 inclusive.

Referring now more particularly to the first 11 FIGS., the stator being manufactured of the exemplification identified by numeral 5, has a number of axially extending insulated slots adapted to receive two distributed wound phase windings having two polar groups of concentric coils. An insulator-forming station I is furnished above (as viewed in the drawings) and in communication with exposed upper walls of a suitable insulator and coil-accommodating means 20 of an insulator and coil-distributing station II. Station I is equipped to automatically form a predetermined number of phase insulators and the axially shorter closure insulators from a continuous strip of insulative material, e.g., polyethylene terephthalate, paper or the like, in a preselected sequence. The shaped insulators are then transferred to the insulator and coil-distributing station II prior to the placement of core 5 into that station by an insulator transfer mechanism 220 which fits over the exposed upper walls of means 20 in telescoping relation therewith. This is accomplished before coil turns are formed into coil groups in means 20 at a turn-forming station III disposed in spaced relation to station II.

Once the insulators have been properly installed into means 20 from a position over station II, means 20 is transported by a conveyor, such as turntable assembly 8, to a turn-forming station III where the desired number of turns are formed in means 20 to provide coil groups for the first phase winding. As this is being done at station III, a second insulator and coil-accommodating means 20A is disposed at station II. At this time, additional insulators of two lengths are automatically formed in the predetermined number at station I and transferred to station II as already outlined in regard to means 20. Thereafter, means 20A is transported to station III, core 5 is conveyed from a core-handling station IV into telescoping relation with means 20 at station II, and both the insulators and coil turns distributed from means 20 into the core while additional two lengths of insulators are being formed and inserted into transfer mechanism 220 in the proper sequence. Core 5 having the insulators and coils in place is then removed from station II, replaced at station IV with another core, and the cycle repeated with this next core. The same apparatus may be used if desired to provide the second phase winding in the first exemplification.

Details of one form of apparatus for achieving the above, as illustrated in FIGS. 1—11 inclusive will now be considered more specifically. The apparatus includes the insulator-making or forming-station I having an assembly 50 for receiving a supply of insulative material 12 in continuous strip form and for automatically fabricating insulators of different axial lengths for inclusion in slotted structure, such as the magnetic stator core 5 in the illustrated exemplification. A material storage reel 10 supplies insulative material 12, which may be suitable dielectric material already mentioned. Reel 10 may be pivoted about a point 14, with insulative material 12 drawn over pulley 16 downwardly, and around pulley 28 upwardly. An end of supply switch 22 and a splice detector assembly 24 may be provided to detect a lack of insulative material or a defect in the supplied material respectively. Conduit 26 contains conductors for splice detector assembly 24, and conduit 26a contains conductors for end of supply switch 22. Pulley 28, splice detector assembly 24 and end of supply switch 22 may be fastened to bracket 29 which is secured to the lower machine frame. Material 12 passes upwardly over the pulley 22, which is fastened to the main frame 30 by means of bracket 32 through the fasteners 34 and 36 and a shaft 38, and then passes over pulley 40 and back down into the insulator-forming assembly 50 at station I.

As depicted in FIG. 1 and as will be more clearly shown hereinafter with reference to FIGS. 2 through 9 inclusive, assembly 50 at station I may include guide means 136 and 138 for guiding insulative material 12 downwardly through at least a portion of the insulator-making operation. A pressure line 25 and a return line 27 carry fluid for a hydraulic motor utilized in this operation, the hydraulic motor being operable through a drive shaft coupled to the cam 90 to provide motive force for a lever arm 60, which is coupled to cam 90 through a connecting arm 98. Lever arm 60 is connected through another arm, to a pawl operative as a pressure member to urge insulative material 12 downwardly. Means is further provided for varying the axial length of insulative material fed to a severing unit to provide variable length insulators which may be utilized in one embodiment to provide a first axial length for phase insulators and a second length for the closure insulators in a stator core 5.

In the illustrated form assembly 50 has insulator mechanism 220 positioned in telescoping relationship above one insulator and coil-accommodating means 20. One construction of means 20 may take the form of that described in more detail in the U.S. copending Arnold application Ser. No. 748,405 identified previously. As each insulator is made, it is transferred into insulator-receiving slots in magazine 220 as best seen in FIG. 5. Magazine 220 may have a number of slots equal to the number of slots adapted to accommodate coil sides in stator core 5, 24 in the two-pole exemplification. When the requisite number of insulators are made for the core 5, a plurality of pushers 300 are inserted into magazine 220, driving the shaped insulators from magazine 220 into the insulator and coil-accommodating means 20. Pushers 300 may be drawn down by a driving force provided through dual cylinders 332 and 342 which receive fluid from pressure line 39 and are operable to exert a pressure on slidable block 302 which is in turn connected to pushers 300.

As shown in FIG. 1, a mounting plate 4 is secured to framing member 3, and in turn provides a mount for tension device 6 and for a guide member 15. A suitable electrically conductive wire 2 may be drawn through guide 11 from a suitable supply (not shown) contained near the machine. Conductive wire 2 may be guided over a first pulley 13, and a second pulley 7, and down through tension device 6 into winding station 17. A gear motor is activated and provides the motive force for the winding head 19 during the homing operation. Pulleys 13 and 7 are secured to a frame 37, and frame 37 is in turn secured to the frame 30. Electrically conductive wire 2 is passed down to the turn-forming station III where one or more coil groups of electrically conductive wire are developed. A more detailed description of one type of turn-forming components which may be used quite advantageously in conjunction with the machine depicted in FIG. 1 is given in the copending Arnold application Ser. No. 748,406.

As shown in FIG. 1, conveyor 8 of the turntable type is supported by a center pedestal 9, and is provided with at least two insulator and coil-accommodating means; e.g., mechanisms or injection tools 20 and 20A in the exemplification. One of the accommodating mechanisms 20 and 20A is positioned beneath assembly 50 and magazine 220 in telescoping relationship therewith, while the other of the accommodating mechanisms 20 and 20A is positioned in the turn-forming station III which may include winding head 19 and a coil-developing apparatus 18 as described more fully in the copending Arnold application Ser. No. 748,406. By utilizing plural insulator and coil-accommodating means, such as mechanisms 20 and 20A, in their described position and relationship, the machine of FIG. 1 is capable of producing coil groups at station III and inserting coils and required insulators into stator core 5 simultaneously with all poles interconnected. Furthermore, the making of a set of insulators may proceed substantially simultaneously with the formation of the groups of coils, and after pushers 300 drive a set of phase and closure insulators into selected slots of accommodating means 20, conveyor 8 may be indexed 180° to allow accommodating means 20 to be positioned at station III for reasons already explained.

INSULATOR-FORMING STATION I

Having briefly described the general arrangement and operation of the apparatus, we will now disclose in detail the illustrated method and apparatus for automatically making or forming wedgelike insulators in a number of different lengths for the axially extending slots in stator core 5. Referring to FIGS. 2 through 9 in the drawings and in particular to FIGS. 2, 3, 6 and 9, assembly 50 at station I may include a feed mechanism 59 for contacting and moving material 12 a predetermined length selectively corresponding to the desired phase or closure insulator length. Feed mechanism 59 may include linkage means which may be a lever-type arm 60 pivoted about the fixed plate 62 through a pivot 64 and connected to a slide block 66 by means of an arm 68. Plate 62 may be secured to plate 178 through bracket 65 and bolts 67 and 69. Arm 68 rotates through the pivot point 70 and 72. A pivot point 74 is provided and is maintained in either of two positions by an air cylinder 76. Air cylinder 76 may have a piston 78 therein, an air cylinder connecting rod 80, and a retaining screw 81. A retaining screw 81 is also provided for side rails 83 and 85. Air cylinder 76 may also be provided with two chambers designated by numerals 84 and 86, said two chambers providing two positions for pivot point 74.

Figure 2:
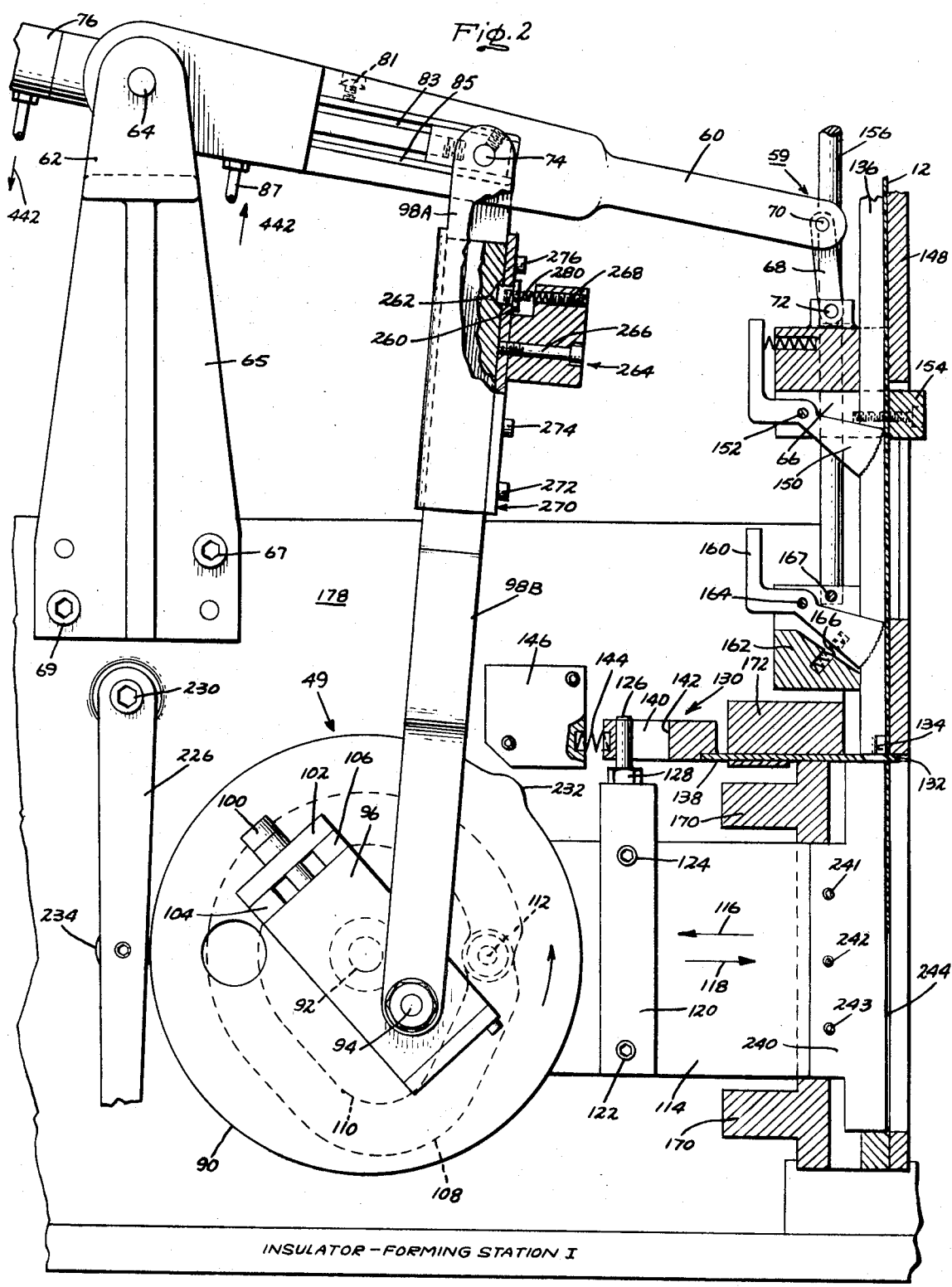
FIG. 2 is an enlarged side view in partial section depicting components of the apparatus of FIG. 1 for forming a first length of insulation from a continuous strip on insulative material, the view showing the components in position as the first length is being severed from the strip.

According to a salient feature of the invention, different lengths of insulators may be provided as hereinafter described, and in one embodiment, the two positions for pivot point 74 correspond to two different insulator lengths, one for the closure insulator and another for the phase insulator. By way of example, when air is forced into chamber 86 of cylinder 76, pivot point 74 is located at the bottom part of lever 60 (to the right in the drawings), and when air is forced into chamber 84 of cylinder 76, pivot point 74 is located at the upper portion of lever 60 (to the left in the drawings), corresponding to a longer length for the phase insulator. The position of pivot point 74 for the shorter length for the closure insulator is depicted in FIG. 2, while the position of pivot point 74 for the phase insulator is depicted in FIG. 6. These insulators are carried in selected slots in magazine 220, depending upon the slots of the core which are to receive a particular insulator at station II.

Referring particularly to FIGS. 2 and 6, a front guide plate 148 and a rear guide plate 136 define an insulator travel path. To feed wedge material 12 downwardly, a first feed pawl 150 is coupled to a slide block 66 by means of fastening pin 152. Pawl 150 and a backup block 154 exert a pressing or pinching force against wedge material 12, urging said material downwardly. A stationary guide rod 156 guides slide block 66 in a vertical path along the desired travel path of material 12 and is securely fastened to holding block 162 by fastener 167. Feed pawl 150 is caused to reciprocate by the linkage mechanisms 68, 70, etc. connected thereto. When slide block 66 reaches the lower limit of its downward travel and begins to move upwardly, a retaining feed pawl 160 oscillates in a stationary retaining or holding block 162 and grips wedge material 12, as shown in dashed outline in FIG. 3, thereby preventing reverse (upward) travel of insulative material 12 during the reverse feed stroke of feed mechanism 59. Retaining feed pawl 160 is connected to holding block 162 by means of a fastening pin 164. A spring 166 keeps retaining feed pawl 160 in locked or retaining position to retard upward movement of insulative material 12.

Referring now in particular to FIGS. 2, 3, and 6, assembly 50 may also include a timing unit 51 having a cam member 90 which is centered about a main drive shaft 92. A pivot point 94 may be located on a slide block 96 to provide different degrees of eccentricity for lever 60. A connecting arm 98 may be coupled about the pivot points 94 and 74. Assembly 50 contains a provision for adjusting the travel distance of slide block 96 and to thereby provide for variable wedge lengths. An adjusting screw 100 and a cover plate 102 (attached atop slide gibs 104 and 106) are provided to so adjust the location of slide block 96. Reference numerals 108 and 110 define the path of travel for cam member 90. A cam follower 112 may be secured to a slide block 114, so that slide block 114 traverses a horizontal path depicted by reference arrows 116 and 118. When slide block 114 reaches the limit of its travel in the direction of arrow 116, a plate 120 (which may be fastened to slide block 114 by means of fasteners 122 and 124) is operative through a connecting stud 126 (fastened to plate 120 by means of lock nut 128) to effect a severing of wedge material 12 by means of severing means 130. Severing means 130 may consist of a pair of blade sections 132 and 134. Blade section 132 may be movable, and blade section 134 may be stationary and may be part of rear guide plate 136. Movable blade 132 may be a part of movable plate 138. Plate 138 may be provided with a slot 140. After the severing of wedge material 12, cam 90 causes slide 114 to move in the direction of reference arrow 118. The rotating action of cam 90, which cam contacts cam follower 112, thus causes a reciprocating action of cutting plate 132. The stud member 126 moves toward the surface 142 of slot 140, and a spring 144 (which is mounted to a spring block holder 146) urges movable blade 132 and the severing unit 130 to the right, providing a passageway through unit 130 for the severed wedge material 12.

Additionally, as shown in FIG. 2, connecting arm or rod 98 may consist of two sections, namely a U-shaped socket 98A and a section 98B which is plugged into U-shaped socket 98A. Attached to socket 98A is a tapered plunger 260 which mates with a detent 262 in section 98B. A bracket 264 is attached to socket 98A by means of screws 266 and 268. Cover plate 270 may be fastened to section 98A by means of the bolts 272, 274 and 276. A spring 280 exerts a force on tapered plunger 260 to hold said plunger in detent position. An excessive force applied through spring 280 urges detent 262 to pop out of section 98B, thereby providing a breakaway action disabling linkage 60.

Referring now in particular to FIGS. 3 and 4, on the side of cam 90 (opposite the side to which main plate 178 is located) a driving means such as hydraulic motor 180 may be provided and coupled to a pinion 182 at one end of hydraulic motor shaft 184. Pinion 182 meshes with a gear 186, which in turn rotates a shaft 92. A right-angle drive unit 188, coupled to shaft 92 through a coupling unit 190, may have a sprocket 192 over the shaft 194. A chain 196 may be coupled between sprocket 192 and a second sprocket 198. Sprocket 198 is attached to a slip friction clutch 200. Friction clutch 200 may have an output shaft 202 which is in turn coupled to the sprocket 204. Sprocket 204 is coupled over a chain 206 to a sprocket 210, which is a part on wedge magazine 220. A bearing unit 208 is also secured to shaft 202. A ratchet plate 212, which is coupled in common to wedge magazine 220 through sprocket 210, is operated through a pawl 214. Pawl 214 is a pivot type pawl, which is coupled to a pull rod 216 by means of a guide 222, and is also coupled to a clevis 224. Clevis 224 is attached to an arm 226 through a pivot 230. Cam 90 is also provided with a ridge 232 which engages the roller 234 on arm 226. As cam 90 is rotating, each time the ridge 232 contacts roller 234, ratchet 212 is disengaged from pawl 214 due to movement to the left of pull rod 216 through arm 226 and clevis 224, etc. For each such disengagement, the magazine 220 is indexed one step, allowing one insulator to be formed as described above and below. If desired, masks may be added to ratchet 212 so that the magazine will index beyond that slot where an insulator will be omitted. This pattern of skipping insulators in certain slots allows the equipment to place as many or as few insulators of a particular kind in the slots as desired, thereby effecting a greater degree of versatility in the equipment.

Assembly 50 may also include shaping means 239 which is more clearly depicted in FIG. 5 in the drawings. Shaping means 239 may include an insulator form punch 240 (which may be a flat plate) securely fastened to a slide plate 114 by means of the fasteners 241, 242 and 243. As cam 90 revolves and strikes cam follower 112, slide plate 114 reciprocates along the direction of the arrows 116 and 118 (as shown in FIG. 2). As slide plate 114 moves in the direction of arrow 118, a severed length of wedge material 12 is positioned in slot 244. Slot 244 is contained within insulator-forming block 252. Insulator-forming block 252 is secured to form plate 250 (which plate 250 may be a continuation of rear guide plate 136) which is slotted to provide for passage of punch 240. A similar slot for punch 240 and the material is provided in insulator-forming block 252. As punch 240 abuts insulative material 12 and drives it toward the direction 118, the material 12 is forced into a slot 220a in magazine 220 (FIG. 5). The driving force of punch 240 eventually drives material 12 completely into slot 220 a and causes the shaping of material 12 to the configuration of the periphery of slot 220a. The shaped material is depicted as formed insulator 246a in slot 220a, and another formed wedge 246b is depicted in slot 220b. The reciprocating action of slide plate 114 and punch 240 and the indexing of magazine 220 cause one insulator to be formed for each slot which is aligned with the punch 240 during the insulator-making operation.

FIG. 8 shows a cam development schematic diagram of the motion of the components of timing unit 49 (along the vertical axis) versus the angle of displacement of cam member 90. As shown therein, the first (top) line represents the motion of the outside periphery of said components and is uniform until the indexing occurs, at which time the motion will be momentarily retarded. The second line represents the motion of form punch 240 which is uniform until just prior to the position of cam 90 before the forming of an insulator from material 12. At the time when cam 90 urges punch 240 into contact with material 12, the motion will be slightly retarded and thereafter will rise until punch 240 has completely inserted material 12 into the desired slot of magazine 220. Thereafter, the motion of punch 240 is again retarded. The third line represents the motion of the feed mechanism 59 components which is clearly depicted as being cyclical due to the reciprocating action of lever 60 through arm 98 and cam 90.

In order to automatically vary the insulator length of severed and formed insulators 246 from material 12, a limit switch 371 (shown in FIG. 7) may be actuated through a removable insulator length form, such as a screw, inserted on ratchet plate 212. This form or screw may be manually inserted when a longer insulator length is desired, or it may be removed if a shorter length is desired. When the form or screw is inserted, a signal from limit switch 371 and a signal from a proximity pickup switch 181 (shown in FIG. 11) resulting from actuation of switch 181 by means of ridge 181a are applied after the last index of a full magazine 220 by suitable control circuitry to input conductor 441 of air valve 440. A conduit 83 is intercoupled between valve 440 and cylinder 86, and hence activation of limit switch 371 effects a flow of fluid through conduit 83 in the direction of arrow 442, resulting in the positioning of cylinder 86 and pivot point 74 in the long length position depicted in FIG. 6. Air valve 440 is actuated by switch 371 and proximity pickup 181 on the return stroke so that the length will be set before the feeding stroke of the material 12 for the production of the next insulator.

TRANSFER OF INSULATORS FROM STATION I TO STATION II

Referring now in particular to FIGS. 7 and 9, after a complete set of wedges 246 are severed and formed within the slots of magazine 220 and conveyor 8 is indexed to locate the upper face of either mechanism 20 or 20A in telescoping relationship with magazine 220, formed insulators 246 may be transferred from magazine 220 into suitable slots in means 20. To effect this transfer, the plurality of insulator pushers 300 may be provided for insertion into individual slots of magazine 220 to drive formed insulators 246 downward into mechanism 20 prior to the formation of turns into the same mechanism. A centrally located shaft 306 is disposed within a bore contained within a round slide block 302. A sliding adapter plate 304 is also disposed about shaft and is affixed to the bottom of slide block 302, and an end of path locator is affixed to the top of shaft 306. A pair of oppositely located brackets 308 and 310 are securely fastened to slide block 302 by means of fasteners 312, 314 and 316, 318 respectively. Brackets 308 and 310 are in turn connected to one end of cables 320 and 322 respectively be means of couplers 324 and 326 respectively. Cable 320 abuts a guide roll and has its other end coupled to a piston 331 of cylinder 332. A similar cable 322 abuts a guide roll 325 and is connected to piston 341 of cylinder 342. Thus, as pistons 331 and 341 are urged upwardly, cables 320 and 322 cause slide block 302 to be driven downwardly. Also, cylinders 332 and 342 are connected to a wedge pusher mounting plate 329 by fasteners 341, 343, 347 and 349 respectively.

Sliding adapter plate 304 may be a spider-type plate having a plurality of coupling sockets 350 axially disposed about the edges thereof, for coupling wedge pushers 300 to adapter plate 304. Wedge pushers 300 may be securely fastened within sockets 350 by means of hose clamplike bands (not shown) on the outside of socket 350.

Insulator magazine 220 indexes on a sleeve-type bearing 360 and on ball bearings 364 which may be retained by a circular plate 366 and an adapter plate 368. A fastening screw 372 fastens adapter plate 368 to main mounting plate 380. Magazine 220 may include a magazine housing 223 which surrounds the circumference of magazine 220 as a restraining media to prevent "fall out" of the formed wedges. Upon completion of the transfer of insulators 246 into appropriate slots of mechanism 20, a limit switch 321 is actuated to return the pushers 300, as will be described hereinafter.

As best seen in FIG. 10, mechanism 20 receives formed insulators 246 in a plurality of insulator guide apertures 824 before stator core 5 is positioned over head assembly 850 and before the electrically conductive coils are placed in head assembly 825 by the turn-forming station.

Wedge-shaped insulators 246 are initially loaded into insulator guide apertures 824 by pushers 300 and coils are placed in the head assembly 825. An actuating assembly 835 is also depicted. The head assembly includes an insulator guide housing 832 and a driven gear 831. The apparatus is rotatably supported on a table 827 by ball bearings 828 and 829. The leading edges of the shaped insulators 246 preferably trail behind the turn-pushing ledges 851 of coil turn feeder blades by a predetermined distance.

INSULATOR AND COIL DISTRIBUTING ASSEMBLY

Actuating assembly 835 may include insulator pushers 867, a driver 868, a stationary plate 869, a blade divider section shaft 864, a piston 872 mounted on shaft 864, a feeder blade cylinder 873, a stack height adjusting stop nut 823, and insulator-positioning stop nut 822.

A divider blade section may include a plurality of guide members 849 (e.g., five in the illustrated embodiment) and an adapter 863 which may be driven by shaft 864. Adapter 863 is provided with a series of pairs of openings 865 and 866 which allow the studs 853 and 854 free axial movement relative to adapter 863, thereby providing a rigid head assembly 825 for guiding the coil turns in the stator slots and minimizing the possibility of damage to conductor wire insulation as the coil turns are inserted through the slot entrances.

Blade divider section shaft 864 has a central bore that extends just below the point where piston 872 is attached on shaft 864. At the lower end, the central bore is connected to a slip ring 887 and to an air hose 888 connected to a source of air pressure, causing shaft 864 to move with feeder blade cylinder 873. A knob 890 on shaft 864 holds slip ring 887 in assembled relation on the shaft 864. A clearance is provided between a lock nut 892 and the bottom plate 891, allowing the insulator and coil-distributing mechanisms 20 and 20A to be transported from one station to another.

The initial position of the mechanisms 20 and 20A is shown together with the position of insulators 246 as the insulator pushers 867 are advanced from the initial position through the three increments of travel A, B and C, each of said increments being measured off from the leading edge of insulator pushers 867. The first increment of travel A represents the distance traveled by insulator pushers 867 or driver 868 from the initial position to the position in which driver 868 engages insulator-positioning stop nut 822, during which increment only insulator pushers 867 are moved in an axial direction. During the increment of travel B, stop nut 823 travels with divider blade shaft 864 in an axial direction toward plate 869 and upon completion through increment B the divider blade section has passed through the bore of stator 5; stack height adjusting nut 823 butts against plate 869. During increment C, insulators 246 emerge from housing 832 into the stator slots, and the axial movement of cylinder 873 is guided by a key 895 attached to shaft 864 and engaged in a keyway 893 formed in cylinder end cap 855. The completion of increment C may be determined by the stroke of the cylinder operating piston rod 881.

OPERATION OF ILLUSTRATED APPARATUS (FIGS. 1—11)

Referring to the sequential operation of the illustrated apparatus, with particular reference to FIG. 11, the cycle is initiated by depression of start cycle button 5' (FIG. 1) which operates by means of appropriate control circuitry to energize hydraulic valve 500 by means of an input signal applied over the conductor 501. Valve 500 may be a double solenoid valve, and a fluid such as oil may flow in the direction of the arrow 503 through conduit 504 and in the direction of the arrow 505 through the conduit 506. Conduit 503 has one end coupled to head block 516 of stator locating cylinder 514, and conduit 506 has one end coupled to another block 515 of cylinder 514. Cylinder 514 is intercoupled to an actuator 508 and is also coupled to a shaft 520. Shaft 520 is coupled to stator holder 518. A longitudinally located slot 524 in shaft 520 engages with a cam follower 526. Valve 500 causes stator locating cylinder 514 to be urged downwardly. Cylinder 514 pulls shaft 520 downwardly and cam follower 526 causes shaft 520 to rotate 90° as it is being pulled down. At the completion of the stroke of valve 500, the stator 5 is located over mechanism 20, which already accommodates insulators and coil turns, in telescoping relation with the upper face of that mechanism and is in position for receiving insulators and conductors. Also, at the end of the downward stroke of valve 500, actuator 508 operates a limit switch 510 through suitable and well-known contact mechanisms.

With the stator 5 located in position on the injection mechanism, the coils may now be injected into the stator. Limit switch 510, operated as described above, generates an output signal which is applied through suitable circuitry over input conductor 531 of solenoid valve 530. When solenoid valve 530 is thus actuated, a fluid such as oil will flow in the direction of arrows 532 through conduits 533 and 537 respectively. A pair of hydraulic motors 534 and 536, coupled together by means of a shaft coupling 538, are actuated upon the flow through said conduits, and oil flow is metered through motor output conduits 540 and 542 which are also interconnected to cylinder blocks 546 and 544 respectively. Cylinder blocks 546 and 544 are respectively part of twin cylinders 550 and 548. Oil metered to cylinder block 544 forces cylinder 548 to move upward, and oil metered to cylinder block 546 urges cylinder 550 to move upward, the said cylinder movements being in unison. Coupling units 552 and 554 are coupled between respective cylinders 548 and 550 and flanged portions 78 and 79 of assembly 68. Hence, the upward movement of cylinders 550 and 548 will urge the injection tooling up, placing windings in stator slots as previously described.

As cylinder 548 reaches the limits of its upward movement or stroke, it will operate limit switch 560 by means of contact of said switch with coupler 552. Upon such actuation, limit switch 560 will send a suitable disabling control signal (by means of suitable circuitry) over conductor 531 causing oil to reverse its flow and to pass through conduit 535 in the direction of arrow 539. A flow of oil in said direction causes the lowering of cylinders 548 and 550. At the bottom of the downward stroke, limit switches 561 and 562 are actuated through coupler 554 and plate 555 respectively. The injection stroke is hence completed and actuation of limit switches 561 and 562 causes a removal of the signal from valve 500 over conductor 501 by means of suitable control panel circuitry.

Substantially simultaneously with the return of the inject coil cylinders, the stator core 5 is returned to the load position. The actuation of limit switches 561 and 562 causes reversal of oil flow in cylinder 514 due to removal of signal from conductor 501. Such reversal causes oil to flow against the direction of arrows 503 and 505, and thus causes cylinder 514 to move upwardly, whence cam follower 526 causes shaft 520 to rotate 90° away from the injection-tooling location, returning said stator to its load position.

Responsive to return of the stator 5 to its load position, stator holder arm 519 will trip actuator 571 to actuate limit switch 570. The output of limit switch 570 may be utilized, through suitable control circuitry, to apply an energization signal over input conductor 575 of hydraulic valve 572. Said energization of valve 572 causes a fluid such as oil to flow through conduit 577 in the direction of the arrow 573. Conduit 577 has one end intercoupled to valve 572 and the other end connected to head block 579 of cylinder 574. Conduit 581 has one end interconnected to valve 572 and the other end coupled to block 583 of cylinder 574. Oil flowing in the direction of arrow 573 will cause cylinder 574 to move downwardly, effecting a downward movement of rod 576 which is coupled to cylinder 574. Rod 576 is also coupled to the frame 580 of wedge maker 50. Thus, a downward movement of rod 576 will cause a lowering of assembly 50 over the mechanism 20 for insertion of insulators in preselected and aligned slots of mechanism 20.

As assembly 50 reaches the limit of its downward movement, frame 580 will contact the actuator 585 of limit switch 582 causing its actuation. The output of limit switch 582 may be utilized, through suitable control circuitry to apply an energization signal over the input conductor 583 of hydraulic valve 333. Valve 333 may be utilized to operate injection rods or pushers 300 through dual cylinders 332 and 342 as hereinbefore described in conjunction with FIG. 9 in the drawings. Hence, conduit 335 may have one end connected to both blocks 337 and 347 of cylinders 332 and 342 respectively, and the other end may be connected to valve 333; conduit 339 may have one end connected to valve 333 and the other end connected to head block 343 of cylinder 332 and the head block (not shown) of cylinder 342. Responsive to the application of said energization signal over input conductor 583, each of the pistons 331 and 341 (shown in FIG. 9) will be driven up and, the pushers 300 will be lowered driving shaped wedges from magazine 220 into the injection mechanism.

As pushers 300 are lowered and wedges are injected, the lower portions of bracket 310 will contact actuator 323 of limit switch 321. Actuation of limit switch 321 will cause, through suitable circuitry, the deenergization of conductor 583. Deenergization of conductor 583 causes a reversal of flow of fluid through conduits 335 and 339 of valve 333, thereby effecting the upward return of the wedge pushers 300. Simultaneously therewith, the signal over conductor 583 also effects the raising of wedge maker 50 by application of said signal over conductor 571 of valve 572, reversing the flow of oil in conduits 577 and 581 and causing the upward movement of cylinder 574 and plate 580.

With the completion of the injection of insulators and the return of transfer magazine 220 to its unoperated, raised position, assembly 50 may be readied to again begin making insulators. Referring to FIGS. 11, 3 and 4, as plate 580 reaches the limit of its upper stroke, it will contact actuator 479 of limit switch 459 (which is secured to plate 473). Operation of limit switch 459 will generate by suitable circuitry, an energization signal which may be applied over input conductor 586 of air valve 588. Air valve 588 is connected to one end of conduit 463 and to one end of conduit 465. The other end of conduit 463 is coupled to head block 467 of cylinder 460, and the other end of conduit 465 is coupled to block 469 of cylinder 460. Energization of valve 588 causes a fluid to flow through conduit 465 from valve 588 to block 469, causing cylinder 460 to move outwardly. Air cylinder 460 has a plunger actuated rod 471 abutting pawl 214. When pawl 214 is separated from ratchet plate 212, it moves outwardly contacting actuator 461 of limit switch 462.

At the same time that plate 580 operates limit switch 459 to cause cylinder 460 to move outwardly, suitable control circuitry may also be utilized to have limit switch 459 operate the valve 602 by applying an energization signal over input conductor 604. Said energization causes a fluid to flow through connecting conduits 603 and 605 thereby operating cylinders 606. Operation of cylinders 606 causes a removal of shot pins 608 (which are coupled to the ends of cylinders 606) from the table-locating notch within main indexing table 8.

The operation of limit switch 462 serves two functions. First, its actuation causes, by suitable circuitry, an energization signal to be applied over input conductor 450 of hydraulic valve 451. Said energization causes a suitable fluid such as oil to flow up through connecting conduit 452 in the direction of arrow 455 and down through conduit 453. Conduits 452 and 453 are also connected to hydraulic motor 180, and the flow of oil through conduits 452 and 453 causes operation of wedge maker 50 as main drive shaft 184 of motor 180 is rotated.

The second function performed by actuation of limit switch 462 relates to the return of cylinder 460 which is only momentarily operated. Operation of limit switch 462 causes, by suitable control circuitry, a deenergization signal to be applied over input conductor 586 of air valve 588. Said signal causes, in return, a reversal of the flow of fluid in conduits 463 and 465 and a return of cylinder 460. Return of cylinder 460 will in turn effect a release of pawl 214, since rod 471, which has contacted pawl 214 as hereinbefore described, is returned with the return of cylinder 460.

When shot pin 608 reaches the limit of its travel upon being pulled from the index-table-locating notch, it will contact the actuator 609 of limit switch 610. Operation of limit switch 610 causes, by suitable control circuitry, an energization signal to be applied over input conductor 612 of hydraulic valve 614. Responsive to said energization a fluid such as oil will flow in connecting conduit 611 in the direction of arrow 612 and will flow in connecting conduit 613 in the direction of arrow 615. Conduits 613 and 611 are connected to head blocks 617 and 619 respectively of table-indexing hydraulic cylinder 616. One end of hydraulic cylinder 616 is connected to a cylinder rod 618, which is in turn coupled to rack 620. Rack 620 may include a plurality of teeth 621 along the inside surface thereof. Teeth 621 mesh with the teeth 623 of gear 622, and the forward (to left in FIG. 11) motion of the cylinder rod 618 caused by fluid flowing through cylinder 616 effects the movement of rack 620 in the direction of arrow 625 and the rotation of gear 622 in a clockwise direction. Gear 622 which is coupled to conveyor 8 by means of connecting shaft 624 in turn effects an index of conveyor 8 in a clockwise direction causing one of the mechanisms 20, 20A to turn through 180° and to be positioned at the distributing station II. At the end of the stroke of cylinder 616, rack 620 contacts actuator 631 of limit switch 630.

After the correct number of insulators are made, as hereinbefore described, and magazine 220 is in its start or raised, unoperated position, pawl 214 drops in a deep notch (not shown) which may be provided in ratchet plate 212 thus contacting the actuator 601 of limit switch 600. Operation of limit switch 600 causes, by suitable control circuitry, a deenergization signal to be applied over conductor 450 of hydraulic valve 451. Said deenergization prevents the flow of fluid in conduits 452 and 453 and causes the turnoff of insulator-making hydraulic motor 180.

The operation of limit switch 630 by means of rack 620 contacting actuator 631 causes, by suitable control circuitry, a deenergization signal to be applied over input conductor 604 of hydraulic valve 602. Said deenergization causes a reversal of the flow of fluid in conduits 603 and 605 and the return of cylinder 606. The return of cylinder 606 (which now moves to the right toward conveyor 8) causes shot pin 608 to enter the table-locating notch which is within indexing table 8, thereby providing a final location of the turntable for the inserting and winding operations.

The return of shot pin 608 causes operation of limit switch 640 by contact of shot pin 608 with actuator 641 of limit switch 640. By means of suitable control circuitry, the operation of limit switch 640 causes an energization signal to be applied over input conductor 651 of winding form air valve 650. A first conduit 652 has one end coupled to valve 650 and the other end coupled to jump cylinder 654, and a second conduit 656 is also interconnected between valve 650 and cylinder 654. The energization of conductor 651 causes fluid to flow through conduit 652 in the direction of the arrow 653 and causes fluid to flow through conduit 656 in the direction of the arrow 657. Said fluid flow thus effects a downward movement of jump cylinder 654 causing the winding forms to be lowered onto the insertion tooling mechanism. After a brief time delay flowing operation of limit switch 640, a time delay circuit (which may be connected to limit switch 640 by suitable control circuitry) may be utilized to provide an energization signal over input conductor 672 of valve 670. Valve 670 in turn is connected to one end of conduit 673, and the other end of conduit 673 is coupled to air clutch 674. Air clutch 674 is coupled to a winding head motor 120 and upon energization of conductor 672 causes the winding head motor to rotate flyer 22 to produce turns with the assistance of the jump forms whereupon valve 670 is deenergized by applying a deenergization signal over input conductor 672. This deenergization signal for valve 670 may be suitably provided by tape reader 127 which may also supply an energization signal over input conductor 662 of valve 660 at a time substantially simultaneous with the deenergization of conductor 672. Conduit 663 may have one end coupled to valve 660 and the other end coupled to an air brake 665 on motor shaft of the winding head motor 120. Upon said energization of valve 660 and deenergization of valve 672, winding head motor 120 and the winding head will stop. The control circuitry may also include a second time delay circuit responsive to the tape reader signal applied over conductor 662 for deenergizing conductor 662 and for energizing electric clutch 674 and gear motor 120 to effect rotation of flyer 22 in the final home position, i.e., the last slow turn(s) of flyer 22. During the last slow turn of flyer 22, tape reader 127 will also generate a control signal which may be used by appropriate circuitry to effect the energization of input conductor 681 of air valve 680. This energization caused air to flow through conduits 683 and 685 effecting the movements of air cylinder 682. Air cylinder 682 is coupled to wire cutter 686 by means of a clevis pin 684, and responsive to said energization wire cutter 686 will extend outwardly to catch the last turn of wire.

Tape reader 127 may also provide a stop control signal to deenergize electric clutch 674 on gear motor 120 stopping flyer 22 and substantially simultaneously energize input conductor 662 of valve 660 to apply the air brake 665. Additionally, at the same time, tape reader 127 may cause an energization signal to be applied over input conductor 693 of wire stripper air valve 690. Conduit 695 may have one end thereof coupled to valve 690 and the other end coupled to cylinder 692; conduit 697 may have one end connected to valve 690 and an end to cylinder 692. Upon said energization, a thin rod 694, which is inside rod 696, is urged downward by the movement of cylinder 692, and said rod 694 will force the last few turns of wire down onto the insertion tooling aiding the aforementioned fall by gravity.

As air cylinder 692 reaches the lower limit of its downward travel, rod 691 connected to cylinder 692 contacts actuator 701 of limit switch 700. By suitable control circuitry, operation of limit switch 700 effects the severing of the wire by wire cutter 686 and deenergizes conductor 693 of valve 690 causing a return of cylinder 692.

The operation of limit switch 700 may also be utilized, by means of suitable circuitry, to cause a deenergization signal to be applied over input conductor 651 of valve 650. Upon said deenergization, jump cylinder 654 is returned due to reversal of fluid flow in conduits 652 and 656. On upward return, jump cylinder 654 pulls winding form apparatus 21 upwardly toward its initial at rest position.

Upon this upward return, plate portion 712 contacts actuator 711 of limit switch 710. By suitable control circuitry, operation of limit switch 710 causes generation of an energization signal over input conductor 721 of hydraulic valve 720. First conduit 723 has one end connected to valve 720 and the other end connected to head block 725 of cylinder 724. A second conduit 727 has one end coupled to valve 720 and the other end coupled to block 729 of cylinder 724. Also, a conduit 731 is intercoupled between head block 725 and head block 735 of cylinder 728. The operation of valve 720 causes oil to flow into head blocks 725 and 733 from conduits 723 and 731 respectively thus effecting the movement of cylinders 724 and 728. Cylinder 724 will move to the left in the drawing of FIG. 11, and cylinder 728 moves outwardly. Cylinder 728 thus pulls or removes indexing shot pin 738. Substantially simultaneously, cylinder 724 (which is connected to the rack 730) causes the insertion tooling to index by a 180° rotation in a counterclockwise direction through the meshing of the teeth on rack 730 with the teeth on gear 740. This rotation positions the insertion tooling for receipt of turns for the second pole in the two pole stator of the exemplification. Those skilled in the art will readily recognize that for stators having other than a two-pole arrangement, the rotation of gear 740 will be in increments smaller than the aforementioned 180°, the size of the increment being dependent upon the number of polar groups of coils.

Upon completion of its stroke, cylinder 724, through a connecting striker plate (not shown) coupled to rack 730, causes actuation of limit switch 750. Through suitable control circuitry, operation of limit switch 750 causes a deenergization signal to be applied over conductor 721 of valve 720. Said deenergization effects a reversal of the flow of fluid through conduits 731, 735, 723 and 727 thereby causing the return of rack 730 to its home position and the placing of shot pin 738 into the tools for final location prior to the winding operation. Rack 730 is driven through an idler gear (not shown) coupled to gear 740. Said idler gear is provided with an overrunning clutch allowing rack 730 to be reset into said home position without effecting rotation of gear 740 on the return stroke of rack 730.

It should also be mentioned that during the winding operation for the first pole, valve 770 is disabled. After a 180° rotation (following completion of the first pole of a two-pole operation), valve 720 is disabled and valve 770 operates for the second pole. Valve 770 includes an input conductor 771, conduits 775 and 773 coupled to valve 770 and cylinder 772, and conduits 778 and 777 coupled to cylinder 776. A rack 779 is coupled to cylinder 772 and has teeth which mesh with gear 774. Cylinder 776 operates a shot pin which locates insertion tooling 20 and 20A.

When shot pin 738 is replaced into the injection tooling, it contacts actuator 761 of limit switch 760. Operation of limit switch 760 causes an energization signal, generated by suitable control circuitry, to be applied over input conductor 651 of valve 650 lowering form 21 onto mechanism 20 or 20A. After a suitable time delay, a signal is applied to input conductor 672 of valve 670, causing operation of winding head motor 120 and the forming of turns in coil groups in the insertion tooling for the other pole in the manner hereinbefore described for the first pole. If more than two polar groups of coils are to be formed, the operation will be repeated for each pole and shot pin 738 will index for each pole, continually operating limit switch 760. After the appropriate number of coil groups have been formed, tape reader 127 generates a control signal indicating that the winding cycle is complete.

By suitable control circuitry, said tape reader control signal may generate an energization signal over input conductor 604 of hydraulic valve 602 causing shot pin 608 to be pulled or removed from main indexing table or turntable 8 through cylinder 606. Responsive to the completion of this stroke, limit switch 614 is operated as previously described.

Said tape reader control signal may also be utilized to provide together with the operation of limit switch 614 (through suitable control circuitry) a deenergization signal over input conductor 612 of valve 614. Said deenergization causes a reversal of fluid flow in conduits 611 and 613 and pulls cylinder 616 and connecting rack 620 to the right effecting a 180° counterclockwise rotation of turntable 8. As rack 620 returns to its right side position, a connecting striker plate 781 contacts actuator 782 of limit switch 780. By suitable control circuitry, operation of limit switch 780 causes a signal to be applied over input conductor 604 of hydraulic valve 602, and cylinder 606 causes reinsertion of shot pin 608 in turntable 8. At this point, if the operator has pushed start cycle button 5, the machine operation will repeat for a new stator.

One of the salient advantages of the above-described method and apparatus is the low total cycle time required for satisfactorily furnishing a slotted magnetic core, such as a stator, with windings and insulators, even where the insulators are of different lengths. Generally, for a distributed wound stator, the total cycle time for one cycle of operation may be determined by the following formula:

$$T_c = t_1 + (P - K_1)K_2 + P\left(K_3 + \frac{t_p - K_4}{S}\right)$$

where, $T_c$ = total cycle time in seconds;

$t_1$ = time in seconds to index the conveyor 8 between stations;

$P$ = number of poles per phase;

$K_1$ = constant, number of indexes required for each mechanism 20, 20A at the turn-forming station III, which is 1 for symmetrical coil groups and is zero for asymmetrical coil groups;

$K_2$ = constant, time to index mechanisms 20, 20A from one position to another in the turn-forming station;

$t_p$ = the total number of turns per pole;

$K_3$ = constant, represents the time in seconds to accelerate, to decelerate, to home, and to catch the wire prior to forming the next coil group and is related to flyer speed;

$K_4$ = constant, represents number of turns generated during acceleration and deceleration; and $S$ = is the speed in revolutions per second (r.p.s.) of the winding head.

As one example of a total cycle time for the production of a distributed wound two-pole stator, it will be assumed that $K_1 = 1$ when the winding is of the symmetrical type. Each pole has the following polar turn distribution (inside coil to outside coil): 22,30,36,43, and 43 of .048 copper wire of 174 turns per pole for $t_p$.

A typical two-pole constant for $K_2$ would approximate 1; $t_1$ would approximate 2 seconds; $P$ would equal 2; $K_3$ would be 4 seconds for a flyer speed of 1,200 r.p.m. or 20 r.p.s. ($S=20$); and $K_4=15$ for the example. Thus, $$T_c = 2 + (2-1)1 + 2\left(4 + \frac{174-15}{20}\right) = 27.0 \text{ seconds}$$

For a typical four-pole distributed wound application, the following is a representative example:

$$T_c = 2 + (4-1)0.5 + 4\left(4 + \frac{150-15}{20}\right) = 46.5 \text{ seconds}$$

These times are more than sufficient to allow formation of the desired number and types of insulators at station I, their installation into mechanisms 20, 20A at station II, the ultimate distribution of insulators and coil groups into the core at that station, and handling of the core at station IV.

Another salient feature is the ease with which a core can be furnished with two phase windings, such as main and auxiliary or start windings for single-phase induction motors where the two phases are formed with different diameter wire. In order to form start windings with the same equipment, it is only necessary to change the position of the core 90° in holder 518 and use start winding material. Only slot closure insulators (of one axial length) need be formed at station I and inserted over the coil sides of the start winding in the appropriate slots carrying these sides. To form the insulators in the desired slots of magazine 220 (conforming to the selected slots of the core where such insulators are needed), certain slots would be masked in the manner previously discussed to prevent inclusion of insulators in those slots not having the start winding sides.

It will be appreciated that the invention is quite versatile in nature and if desired, for example, the insulator-forming station could be disposed away from the distributing station such that the insulators could be transferred into mechanisms 20, 20A at a location other than at the distributing station. Moreover, the core could be installed in a holding device and a number of phase windings developed in the core at different locations while maintained in the same device.

DESCRIPTION OF SECOND ILLUSTRATED EMBODIMENT

The second embodiment, illustrated in FIGS. 12—15 inclusive is capable of developing insulators of different lengths and coil groups of different phases in a slotted core structure in a continuous operation. More specifically, as shown in these figures where like components to those discussed in regard to the first 11 figures are identified by similar reference numerals, conveyor 920 carries slotted magnetic cores, stator cores each adapted to receive two phase windings of two coil groups each in the exemplification, in holding devices 924, 926, 928, and 930 from a core-handling station (position A) where the cores are loaded into the devices to an insulator and coil-distributing station at C of the first phase winding development. At this location, in the same manner already outlined in connection with the first embodiment, suitable insulators are formed at an insulator-forming station and transferred into mechanisms 20, 20A at the distributing station.

Also, turns for the first phase winding are produced into coil groups in mechanisms 20, 20A at the turn-forming station after the mechanisms have selectively received the insulators. For simplicity in presentation, the illustrated apparatus at these stations is identical to those already discussed with respect to the first embodiment.

The cores are sequentially transported in the holding devices from position C, the first phase winding development location, to a winding pressback station at E where the first phase winding is automatically pressed back the desired amount relative to the core to obtain additional space in the slots and at the side core faces to receive the second phase winding and to position the end turns away from the stator core without the need for removing the core having the winding (core 934 in FIG. 12) from its associated holder 926.

The core having the pressback first phase winding is then transported in its holder (e.g. 928) to position G at the second phase winding development where the second phase winding and slot closure insulators are distributed in the proper slots of the core at another insulator and coil-distributing station, the second winding being disposed approximately 90 electrical degrees from the first phase winding. The various components of the apparatus of the second phase winding development, for ease of presentation, are also basically similar in construction to that discussed in regard to the first embodiment, although in mirror image, and are denoted by similar numerals with primes. Finally, the core having the two phase windings is returned to position A, the core-handling station, where it is removed (either manually or automatically) from the holder and replaced by another core.

Turning now to a more detailed consideration of the second illustrated embodiment, a main frame 900 supports three central pedestals and support structures 902, 904 and 906 which in turn respectively carry three cooperating conveyors 8, 920 and 8', with conveyor 920 being located intermediate the other two. As illustrated, these conveyors are of the turntable-indexing type, but of course may be of other well-known types, e.g., a single conveyor of the inline, walking kind. With reference to conveyor 920, as shown, it mounts the four core-holding devices through connecting arms 940, 942, 946, and 948 respectively. Conveyor 920 is rotatably indexed in the direction of arrow 923 by motor 921 through center pedestal 904 and is vertically movable along the direction of arrows 925. In order to transport the holding devices having cores therein progressively through the individual stations at positions A, C, E, and G, during the indexing operation, the conveyor is initially moved upwardly (as viewed in the drawings) a sufficient distance until all cores are clear of the apparatus at those positions. Then the holding devices are indexed 90 mechanical degrees in their raised positions (see holding device 926 shown in FIG. 12 by the broken lines) to the next station where they are lowered into their respective positions shown in full in FIGS. 12—15. They are maintained in each station a sufficient period of time to complete the operation being performed on the cores in those stations. Apparatus forming a part of the first and second phase winding development, for instance, components at the insulator-forming station, should be mounted high enough to allow the unimpeded movement of the cores and their holding devices in their raised positions between stations (e.g., broken lines in FIG. 13).

Since all stations other than the winding pressback station have already been considered in detail, this latter station, denoted at 950, will now be described in regard to FIGS. 12-—15. It includes a support frame 949, which mounts equipment for automatically connecting the first phase winding with a suitable electrical energy pulse source for generating a pulse of energy in the winding to create electromagnetic forces of a predetermined magnitude sufficiently high to effect the desired pressback or winding transformation. In particular, frame 949 mounts arms 952 and 954 rotatably about pivots 956 and 958 respectively. Each arm supports a pair of electrical connectors 951, 953; 955, and 957 respectively. Conductor terminals 960 and 961 and terminals 962 and 963 may each be interconnected to a suitable energy pulse source which may be of the kind disclosed in detail in the R. G. Rushing U.S. Pat. No. 3,333,328 issued on Aug. 1, 1967. The other ends of the conductors may be fastened to arm hinges 964, 965, 966 and 967 respectively. Each arm hinge is coupled to an air cylinder, such as the cylinders 968, 969, 970 and 971 respectively by means of cylinder arms 972, 973, 974 and 975 respectively. Also shown in FIG. 13 are a pair of air cylinders 976 and 977 coupled to arms 952 and 954 respectively by means of cylinder arms 978 and 979 and hinges 980 and 981 respectively. Operation of cylinders 976 and 977 by suitably connected hardware causes movement of arms 952 and 954 for closing the pairs of connectors over the winding leads or wires to connect the winding to the energy source.

FIG. 13 depicts a winding pressback station for a two-pole stator core 934 having leads extending out on each polar coil group. This station may include a nonmagnetic and electrically conductive structure adapted to fit into the stator bore, such as a copper member 982 having peripheral insulation and securely fastened to the support frames 949 and 947, fasteners 945, 943 and 983, plate 984, and bolts 985 and 986.

When the core having the first phase winding with closure and phase insulators in certain slots is lowered over member 984 at station E, each pair of electrical connectors is in the open position for picking up the winding leads. Air cylinders 976 and 977 are then operated to cause rotation of arms 952 and 954 to dispose connectors 951, 953, 955 and 957 adjacent each winding lead 990, such as illustrated by the solid lines in FIG. 15. Hinges 964, 965, 966 and 967 may have a rough knurled surface 991 on the interior of one surface thereof, and a stationary block 992 may have a similarly rough knurled surface 993 on the inside surface thereof in order to cut through the insulation on the leads to make a good electrical connection therewith. Operation of air cylinders 968, 971 by suitable circuitry (not shown) causes rotation of hinges 964, 965, 966, and 967 and the knurled surfaces 991 and 993 of each hinge to the closed position (seen by the broken line in FIG. 15) to connect the winding in a load circuit. Each conductor, e.g. conductor 951, is securely fastened to a stationary block, such as block 992, by means of a suitable fastening means 994.

At this time, a suitable energy pulse may be supplied through the load circuit. The pulse generated in the first winding phase effects pressback of the winding in the way outlined in the Rushing patent. Member 984 is employed for the reasons given in that patent. If desired, the pulse may be generated in the winding as disclosed in U.S. Pat. No. 3,333,330 of Clovis E. Linkous issued Aug. 1, 1967, which discloses an inductive coupling technique. In that case, the connectors may provide a short-circuited condition for the winding carried by the core. This pressback operation is accomplished concurrently with those being performed at positions A, C, and G and the formation of turns and insulators at the turn-forming and insulator-forming stations. After completion of the pressback action, cylinders 968, 969, 975, 976, 977 and 978 are operated to return the components to their original, open positions preparatory to operating on the next core having windings and insulators therein.

From the foregoing description of the improved method and apparatus for forming and distributing insulators and coil turns in coil groups into a slotted structure, it will be apparent that electromagnetic devices may be manufactured with increased efficiency at reduced cost to provide an improved product. The apparatus can be easily utilized to furnish insulators having one or more lengths in a preselected sequence, such as is desirable for producing closure and phase insulators of differing lengths. Also, more than two different lengths may be obtained for a single-slotted core or for different-sized cores by merely regulating the stroke of the components of assembly 50. The total cycle time for a machine operation may be reduced thereby increasing its production efficiency. Further, a high degree of versatility is provided with the capability of changing from one winding type to another by simple adjustments and for different kinds of slotted structures.

While we have shown and described various embodiments of the invention, it will be readily apparent and obvious to those skilled in the art that changes and modifications may be made without departing from the invention. It is therefore intended in the appended claims to cover all such changes and modifications that fall within the true spirit and scope of the invention.

What we claim as new and desire to secure by Letters Patent of the United States is:

1. Apparatus for forming insulators from a strip of insulative material, for developing at least one coil group into poles of a phase winding formed of conductive wire, and for inserting the insulators and at least one coil group into axially extending slots of a magnetic core, the apparatus comprising: an insulator-forming station having an assembly mounted on a platform for forming insulators in slots of an insulator magazine; said insulator magazine having a first position aligned with said assembly and having axial slots circumferentially located about the magazine periphery for selectively receiving a set of shaped insulators from said assembly at the insulator-forming station; a conveyor having at least two coil-accommodating and injection mechanisms spaced apart thereon for receiving shaped insulators from said assembly and the at least one coil group and for injecting the insulators and the at least one coil group into slots of the magnetic core, one of said coil-accommodating and injection mechanisms being selectively in telescoping relationship with said insulator magazine at a second position of the insulator magazine; means for selectively moving said insulator magazine between the first position and the second position; means for transferring the insulators from the magazine into the one coil-accommodating and injection mechanism when the magazine is disposed in telescoping relation therewith at the second position; and coil-developing means spaced apart from the insulator-forming station for generating the at least one coil group from wire selectively in the mechanisms after the insulators have been transferred therein.

2. The apparatus of claim 1 in which the assembly for forming insulators in slots of the insulator magazine is capable of forming the insulators into at least two different lengths and comprises: guide means for containing a section of the strip of insulative material; a feed mechanism having material-advancing means along the guide means and material-retaining means; linkage means coupled to said material-advancing means and having a movable pivot operable to effect a change in the length of insulative material advanced; timing means connected to said linkage means for effecting periodic reciprocating movement thereof; severing means operatively associated with said timing means and operable to cyclically sever an advanced length of insulative material; and means for controlling the position of the movable pivot of said linkage means in response to a selected position of the insulator magazine.

3. The apparatus of claim 1 in which the platform of the insulator-forming station is movable toward and away from the one coil-accommodating and injection mechanism; a plurality of pushers aligned with the slots of said insulator magazine, and means responsive to a movement of said platform toward the one mechanism for causing said pushers to drive the shaped insulators from said insulator magazine into said one coil-accommodating and injection mechanisms when the insulator magazine is disposed in the vicinity of said one mechanism at the second position.

4. The apparatus of claim 1 in which the coil-developing means includes a winding head and flyer for generating turns selectively in the coil-accommodating and injection mechanisms, and means for controlling operation of the apparatus generally in accordance with the formula $$T_c = t_1 + (P - K_1)K_2 + P\left(K_3 + \frac{t_D - K_4}{S}\right)$$

where:

$T$ = total time of the operating cycle in seconds;

$t_1$ = time in seconds to index the respective mechanisms from one position to another;

$P$ = number of poles per phase;

$K_1$ = 1 for symmetrical coil groups and zero for asymmetrical coil groups;

$K_2$ = time in seconds to move coil-accommodating and injection mechanisms from one position into another position during generation of the at least one core group;

$K_3$ = time in seconds to accelerate, decelerate, home and is related to flyer speed;

$K_4$ = number of turns generated during acceleration and deceleration;

$t_p$ = total number of turns per pole; and $S$ = speed of winding head in r.p.s.

5. Apparatus for forming insulators from a strip of insulative material and for developing coils in preselected axially extending slots of a slotted structure comprising: insulator-producing means mounted on a platform for forming insulators from the strip into predetermined lengths in axial slots of an insulator-receiving mechanism, said mechanism having a first position in which the slots sequentially receive insulators from the insulator-producing means and a second position disposed adjacent guide apertures opening at one face of an insulator and coil-turn inserting assembly, with the slots of the insulator-receiving mechanism being disposed in alignment with the guide apertures next to the one face when in the second position; means for transferring the insulators from the mechanism to said assembly when said mechanism is disposed in the second position; said assembly having means opening at the one face to receive coil turns; and means for inserting the insulators and coil turns into the preselected slots of the slotted structure from said assembly when slotted structure is disposed at the second position and the insulator-receiving mechanism is in the first position.

6. The apparatus of claim 5 in which the means for forming insulators from the strip into predetermined lengths in axial slots of the insulator-receiving mechanism comprises: guide means for containing a section of the strip of insulative material; a feed mechanism having material-advancing means along the guide means and material-retaining means; linkage means coupled to said material-advancing means and having a movable pivot operable to effect a change in the length of insulative material advanced; timing means connected to said linkage means for effecting periodic reciprocating movement thereof; severing means operatively associated with said timing means and operable to cyclically sever an advanced length of insulative material; and means for controlling the position of the movable pivot of said linkage means in response to a selected position of the insulator-receiving mechanism.

7. Apparatus for forming insulators and for developing coils in preselected slots of a slotted structure comprising: means for forming insulators in slots of an insulator-receiving mechanism related to preselected slots of the slotted structure; means for transferring the insulators from the mechanism into guide apertures of an insulator and coil-turn inserting assembly, with the slots of the mechanism being disposed in alignment with the guide apertures; said assembly having means for receiving coil turns; means for inserting the insulators and coil turns into the preselected slots of the slotted structure from said assembly when the preselected slots are disposed in alignment with the apertures of the assembly; holding means for retaining the slotted structure in aligned position with the apertures as the insulators and coil turns are being inserted into the preselected slots; means for pressing back the coil turns relative to the slotted structure as the slotted structure is being retained by said holding means; and conveyor means for transporting the holding means having the slotted structure from the assembly to the means for pressing back the coil turns.

8. The apparatus of claim 7 in which the means for forming insulators in slots of an insulator-receiving mechanism comprises: guide means for containing a section of the strip of insulative material; a feed mechanism having material-advancing means along the guide means and material-retaining means; linkage means coupled to said material-advancing means and having a movable pivot operable to effect a change in the length of insulative material advanced; timing means having a rotating member connected to said linkage means for effecting periodic reciprocating movement thereof; severing means operatively associated with said timing means and operable to cyclically sever and advanced length of insulative material; and means for controlling the position of the movable pivot of said linkage means in response to a selected position of the insulator-receiving mechanism.

9. The apparatus of claim 7 in which the means for pressing back the coil turns includes electrical connectors to connect the coil turns in a load circuit with an energy pulse source for generating electromagnetic forces to effect the desired pressback of the turns.

10. Apparatus for forming insulators into at least two different lengths and for developing coils in preselected slots of a slotted structure comprising: means for forming insulators into at least two different lengths in slots of an insulator-receiving mechanism related to preselected slots of the slotted structure; means for transferring the insulators from the mechanism into guide apertures opening at one face of an insulator and coil-turn inserting assembly, with the slots of the mechanism being disposed in alignment with the guide apertures next to the one face; said assembly having means opening at the one face to receive coil turns; and means for inserting the insulators and coil turns into the preselected slots of the slotted structure from said assembly when the preselected slots are disposed next to said one face of the assembly.

11. The apparatus of claim 10 including at least one holding device for retaining the slotted structure with its preselected slots disposed next to said one side face of the assembly as the insulators and coil turns are being inserted with the preselected slots; and means for pressing back the coil turns relative to the slotted structure as the slotted structure is being retained by said holding device.

12. The apparatus of claim 11 in which the latter means includes electrical connectors to connect the coil turns in a load circuit with an energy pulse source for generating electromagnetic forces to effect the desired pressback of the turns.

13. The apparatus of claim 10 in which the means for forming insulators into at least two different lengths in slots of an insulator-receiving mechanism comprises: guide means for containing a section of the strip of insulative material; a feed mechanism having material-advancing means along the guide means and material-retaining means; linkage means coupled to said material-advancing means and having a movable pivot operable to effect a change in the length of insulative material advanced; timing means for connection to said linkage means for effecting periodic reciprocating movement thereof; severing means operatively associated with said timing means and operable to cyclically sever an advanced length of insulative material; and means for controlling the position of the movable pivot of said linkage means in response to a selected position of the insulator-receiving mechanism.

14. The apparatus of claim 10 in which the insulator and coil-turn inserting assembly comprises means for effecting a telescoping relation with said insulator-receiving mechanism to facilitate transfer of the insulators from the mechanism to the assembly; insulator guide means for guiding said severed and shaped insulators into the axially extending slots of the slotted structure, pusher means associated with said insulator guide means for forcing said insulators into selected axially extending slots of the slotted structure, a coil-turn feeder assembly including a preselected number of divider blades and coil-turn feeder blades, at least one of said coil-turn feeder blades faces defining turn-receiving gaps with opposed faces of adjacent divider blades when said pusher means are in an initial position, said turn-receiving gaps being aligned with selected pairs of slot entrances of the slotted structure for axially feeding conductor wire into predetermined pairs of the slots of the slotted structure, and means for driving said pusher means and said coil-turn feeder blades from an initial position to a fully extended position thereby to effect a placement of said insulators and side turn portions of the electrical coil in preselected slots of said slotted structure.

15. A method of forming insulators in at least two different lengths and for developing at least one winding in preselected slots of a slotted structure comprising the steps of: forming insulators of at least two different lengths in selected positions in a slotted assembly related to preselected slots of the slotted structure at an insulator-forming station, disposing the assembly next to a face of an insulator and winding accommodating mechanism, and transferring the insulators from the assembly into predetermined apertures of the mechanism; producing turns of the winding in the insulator and winding accommodating mechanism; and holding the slotted structure in the vicinity of the face with the predetermined apertures being aligned with the preselected slots of the slotted structure; and distributing the insulators and winding into the preselected slots of the slotted structure from the mechanism.

16. The method of claim 15 in which the insulators are closure and phase insulators and the phase insulators are distributed in slots of the slotted structure adapted to receive additional windings.

17. The method of claim 15 in which the insulators are formed at a first station, the turns are produced at a second station, and the insulators and windings are distributed in the slotted structure at a third station, with the three stations being disposed in spaced relation with respect to one another.

18. A method for forming insulators and developing coils in slots of a magnetic core comprising the steps of: forming a number of insulators and placing them in an insulator-receiving mechanism; transferring the insulators selectively from the insulator-receiving mechanism into guide apertures having openings at one face of an insulator and coil-turn inserting assembly, with the insulator-receiving mechanism disposed adjacent the one face of the assembly; developing coil turns in the assembly at a preselected location; transporting the assembly having insulators and coil turns therein to another location; maintaining a magnetic core adjacent the one face and inserting the insulators and coil turns into slots of the core.

19. A method for forming insulators and developing coils in slots of a magnetic core comprising the steps of: forming a number of insulators and placing them in an insulator-receiving mechanism; transferring the insulators from the insulator-receiving mechanism selectively into guide apertures of an insulator and coil-turn inserting assembly; developing coil turns in the assembly; maintaining the magnetic core in a holding device adjacent the assembly and distributing coil turns and the insulators into slots of the magnetic core; transporting the magnetic core having the turns and insulators in the holding device away from the assembly and into a coil pressback station; and pressing back the winding relative to the magnetic core in that station as the magnetic core is being retained by the holding device.

20. The method of claim 19 comprising the further steps of: distributing additional coil turns and insulators in slots of the magnetic core as the magnetic core is still being retained by the holding device.